(12) United States Patent
Nada et al.

(10) Patent No.: US 9,298,996 B2
(45) Date of Patent: Mar. 29, 2016

(54) BIOMETRIC AUTHENTICATION DEVICE AND METHOD

(71) Applicant: Fujitsu Limited, Kawasaki-shi, Kanagawa (JP)

(72) Inventors: Hajime Nada, Kawasaki (JP); Toshio Endoh, Yokohama (JP); Takashi Shinzaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 14/244,310

(22) Filed: Apr. 3, 2014

(65) Prior Publication Data

US 2015/0043792 A1     Feb. 12, 2015

(30) Foreign Application Priority Data

Apr. 22, 2013   (JP) .................................. 2013-089058

(51) Int. Cl.
*G06K 9/00* (2006.01)
*G06F 21/32* (2013.01)

(52) U.S. Cl.
CPC ............ *G06K 9/00926* (2013.01); *G06F 21/32* (2013.01); *G06K 9/0002* (2013.01); *G06K 9/00006* (2013.01); *G06K 9/00087* (2013.01); *G06K 9/00912* (2013.01); *G06K 2009/0006* (2013.01)

(58) Field of Classification Search
None
See application file for complete search history.

(56) References Cited

U.S. PATENT DOCUMENTS

| | | | |
|---|---|---|---|
| 2002/0184538 A1 | 12/2002 | Sugimura et al. | |
| 2002/0194003 A1* | 12/2002 | Mozer ........................ | 704/270.1 |
| 2005/0105782 A1* | 5/2005 | Abiko .......................... | 382/124 |
| 2006/0120576 A1* | 6/2006 | Chen ............................ | 382/124 |
| 2007/0177777 A1* | 8/2007 | Funahashi et al. ........... | 382/124 |
| 2008/0253619 A1 | 10/2008 | Hagino et al. | |
| 2009/0245596 A1 | 10/2009 | Niinuma | |
| 2010/0085152 A1* | 4/2010 | Fukuda et al. ............... | 340/5.82 |
| 2010/0192096 A1* | 7/2010 | Barrett ......................... | 715/811 |
| 2011/0138187 A1 | 6/2011 | Kaga et al. | |
| 2012/0250954 A1 | 10/2012 | Nada et al. | |

FOREIGN PATENT DOCUMENTS

| | | |
|---|---|---|
| EP | 2053777 | 4/2009 |
| EP | 2202685 | 6/2010 |

(Continued)

OTHER PUBLICATIONS

Extended European Search Report dated May 30, 2014 in corresponding European Patent Application No. 14163838.7.

(Continued)

*Primary Examiner* — Eueng-Nan Yeh
(74) *Attorney, Agent, or Firm* — Staas & Halsey LLP

(57) ABSTRACT

A biometric authentication device includes: a memory; and a processor coupled to the memory and configured to: determine, when authentication with first biometric information has been successful, whether second biometric information different from the first biometric information is from a user corresponding to the first biometric information using a determining method corresponding to one of a plurality of security levels, the determining method being selected from among a plurality of determining methods based on the one of the plurality of security levels, and register, when the second biometric information has been determined to be from the user, the second biometric information associated with the user.

12 Claims, 24 Drawing Sheets

(56) References Cited

FOREIGN PATENT DOCUMENTS

| | | |
|---|---|---|
| EP | 2506188 | 10/2012 |
| JP | 2003-050783 | 2/2003 |
| JP | 2008-077204 | 4/2008 |
| JP | 2009-238014 | 10/2009 |
| JP | 2011-123532 | 6/2011 |
| JP | 2012-208682 | 10/2012 |

OTHER PUBLICATIONS

"Continuous Verification Using Multimodal Biometrics", Sim et al., IEEE Transactions on Pattern Analysis and Machine Intelligence, vol. 29, No. 4, Apr. 2007, pp. 687-700.

* cited by examiner

FIG. 5

| CHECKPOINT 1 | METHOD 1 | CONFIRMATION LEVEL 1 |
|---|---|---|
| CHECKPOINT 2 | METHOD 2 | CONFIRMATION LEVEL 2 |
| ⋮ | ⋮ | ⋮ |

SIDE VIEW

FIG. 9

| PALM INCLINATION (ANGLE IN DIRECTION FROM FINGERTIP TO WRIST, POSITIVE VALUE IS IN THE CASE THAT FINGERTIP SIDE IS RAISED) | RATE OF FINGERPRINT AREA OF INDEX FINGER (CALCULATED WITH 0 DEGREES AS 1) | RATE OF FINGERPRINT AREA OF MIDDLE FINGER | RATE OF FINGERPRINT AREA OF THIRD FINGER |
|---|---|---|---|
| ⋮ | ⋮ | ⋮ | ⋮ |
| +15° | 0.9 | 0.9 | 0.9 |
| +10° | 0.95 | 0.95 | 0.95 |
| +5° | 1 | 1 | 1 |
| 0° | 1 | 1 | 1 |
| -5° | 1 | 1 | 1 |
| -10° | 1.05 | 1.05 | 1.05 |
| ⋮ | ⋮ | ⋮ | ⋮ |

FIG. 19

| PRIORITY | POINTS TO BE CHECKED | RELIABILITY LEVEL | IMPLEMENTATION TIME | DATA SIZ |
|---|---|---|---|---|
| FIRST PLACE | SECOND POINT TO BE CHECKED (DETERMINATION WITH NEW BIOMETRIC INFORMATION ACQUIRED AT EXTERNAL DEVICE) | LARGE | SEVERAL SECONDS | SMALL |
| SECOND PLACE | FIRST POINT TO BE CHECKED (DETERMINATION WITH CAMERA) | LARGE | SEVERAL SECONDS | LARGE |
| THIRD PLACE | FOURTH POINT TO BE CHECKED (DETERMINATION WITH PULSE) | MEDIUM | 30 SECONDS | MEDIUM |

BIOMETRIC AUTHENTICATION DEVICE AND METHOD

CROSS-REFERENCE TO RELATED APPLICATION

This application is based upon and claims the benefit of priority from the prior Japanese Patent Application No. 2013-089058 filed on Apr. 22, 2013, the entire contents of which are incorporated herein by reference.

FIELD

The embodiments discussed herein are related to biometric authentication.

BACKGROUND

There are more and more cases in biometric authentication systems where, in addition to an already-registered biometric information, users register and use new biometric information, in order to handle increase in users of biometric authentication systems, improve the rate of handling users, and so forth. Security in such a situation, to confirm that the person inputting biometric information to be newly registered is the same person as the registrant of registered biometric information, is important.

There has been prior art for ensuring that new and old biometric information are biometric information derived from the same person (for example, Japanese Laid-open Patent Publication No. 2011-123532 and Japanese Laid-open Patent Publication No. 2012-208682), such as art for automatically registering new biometric information in a biometric authentication device based on multiple numbers of times of authentication results, art for ensuring that two pieces of biometric information are derived from the same person, based on positional relation between a fingerprint image and a palm image, and so forth.

SUMMARY

According to an aspect of the invention, a biometric authentication device includes: a memory; and a processor coupled to the memory and configured to: determine, when authentication with first biometric information has been successful, whether second biometric information different from the first biometric information is from a user corresponding to the first biometric information using a determining method corresponding to one of a plurality of security levels, the determining method being selected from among a plurality of determining methods based on the one of the plurality of security levels, and register, when the second biometric information has been determined to be from the user, the second biometric information associated with the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram representing an example of points to be checked stored in a database or the like;

FIG. 9 is a created table representing relevance between palm inclination and the area of a fingerprint image;

FIG. 19 is an example of checkpoint candidates;

DESCRIPTION OF EMBODIMENTS

Figure 1A:
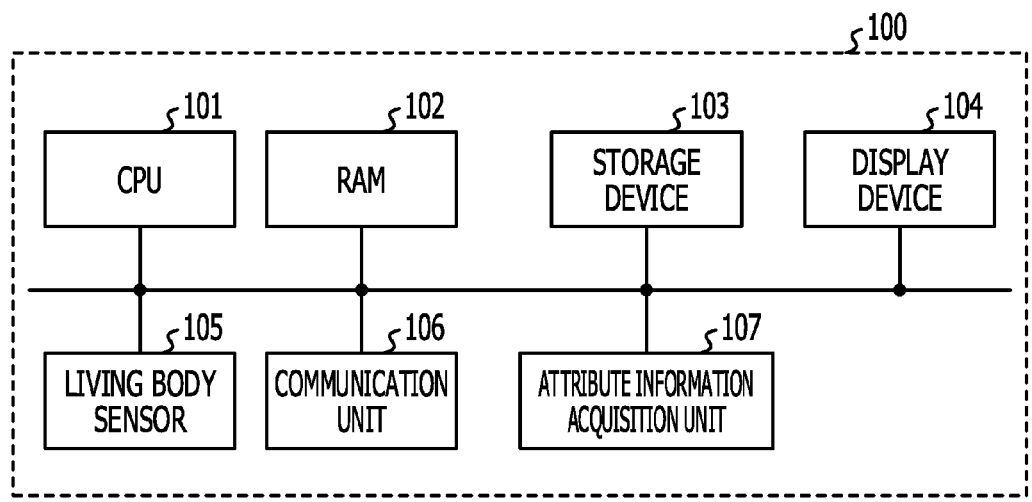
FIG. 1A is a block diagram for describing a hardware configuration of a biometric authentication device according to a first embodiment.

A biometric authentication device is used even in an environment where use by many users is assumed, such as personal authentication in a local government or the like. It is not realistic from an aspect of convenience to cause a user to perform authentication multiple times in such an environment, such as in the prior art.

Also, it is common that security levels demanded from biometric authentication devices differ depending on the biometric authentication devices. Accordingly, when ensuring that new and old biometric information are derived from the same person at the time of registering new biometric information, it is desirable that accuracy of security thereof may be changed depending on security levels. However, such a case has not been assumed in the prior art.

It is an object of an aspect to improve authentication accuracy that new and old biometric information are derived from the same person with accuracy according to the security level of a biometric authentication device.

The art disclosed in the embodiments enables improvement in authentication accuracy that new and old biometric information are derived from the same person with accuracy according to the security level of a biometric authentication device in which registration opportunities for new and old biometric information are restricted.

First, terminologies to be used in the following embodiments will be described. Instances are units of a living body to be used for authentication, for example, such as fingers, palms, face, eyes, and so forth. Accordingly, a finger and a palm are different instances. Also, a middle finger and an index finger are also different instances, and the left eye and right eye are also different instances. Modalities are kinds of living body features, for example, such as a fingerprint, a vein, an iris, a face shape, a palm shape, and so forth. Accordingly, a fingerprint and a vein of the same finger are different modalities.

Biometric information is information relating to a living body, and includes living body features representing individual features of a living body, and so forth. Different kinds of biometric information are a plurality of biometric information of which at least any one or more of modalities, instances, acquisition methods, and authentication methods differ. Examples of different modalities include a case where existing biometric information is a fingerprint, and new biometric information is a palm vein. Also, examples of different acquisition methods include a case where existing biometric information is the fingerprint of a third finger acquired at a contact-type fingerprint sensor, and new biometric information is the fingerprint of an index finger acquired at a noncontact-type fingerprint sensor. Further, examples of different authentication methods include a case where existing biometric information is the fingerprint of an index finger, new biometric information is the fingerprint of another finger, and both are acquired by the same fingerprint sensor, but the authentication method in the case of employing the fingerprint of the index finger differs from the authentication method in the case of employing the fingerprint of the other finger. For example, an index finger, a thumb, and a little finger greatly differ in the finger width, and accordingly, the authentication methods of both may differ. Also, an index finger and another finger differ in easiness of fingerprint input, and accordingly, the authentication methods of both may differ.

Hereinafter, embodiments will be described with reference to the appended drawings.

First Embodiment

Figure 1B:
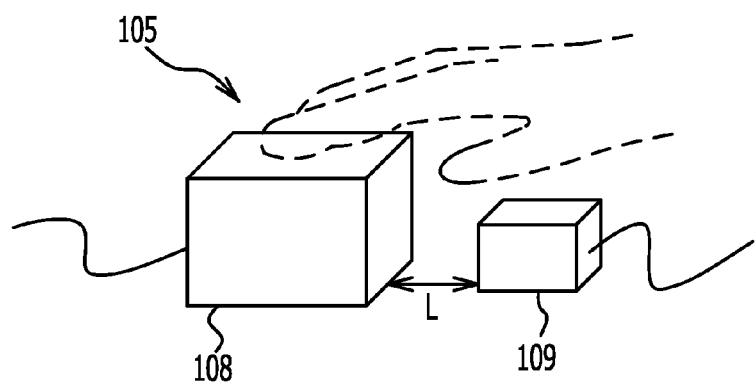
FIG. 1B is a schematic diagram of a living body sensor.

FIG. 1A is a block diagram for describing a hardware configuration of a biometric authentication device 100 according to a first embodiment. FIG. 1B is a schematic diagram of a later-described living body sensor 105. As illustrated in FIG. 1A, the biometric authentication device 100 includes a CPU 101, RAM 102, a storage device 103, a display device 104, a living body sensor 105, a communication unit 106, attribute information acquisition unit 107, and so forth. These units are connected by a bus or the like.

The CPU (Central Processing Unit) 101 is a central processing unit. The CPU 101 includes one or more cores. The RAM (Random Access Memory) 102 is volatile memory configured to temporarily store a program that the CPU 101 executes, data that the CPU 101 processes, and so forth.

The storage device 103 is a nonvolatile storage device. Examples of the storage device 103 includes (ROM) read only memory, a solid state drive (SSD) such as flash memory or the like, and a hard disk to be driven by a hard disk drive. A biometric authentication program according to the present embodiment is stored in the storage device 103. The display device 104 is a liquid crystal display, electroluminescence panel, or the like, and displays results of later-described additional registration processing, and so forth.

The living body sensor 105 is a sensor configured to detect biometric information of a user, and detects multiple different kinds of biometric information. The living body sensor 105 according to the present embodiment acquires a fingerprint image of multiple fingers as existing biometric information, and also acquires a palm vein image as new biometric information. That is to say, the living body sensor 105 acquires different modalities such as fingerprints and veins with different instances such as multiple fingers and a palm as objects.

As illustrated in FIG. 1B, the living body sensor 105 includes an existing biometric information acquisition unit 108 and a new biometric information acquisition unit 109. The existing biometric information acquisition unit 108 is an optical sensor or electrostatic capacity sensor or the like, and acquires a fingerprint image of two or more fingers. Either one of a contact type and a noncontact type may be employed as the existing biometric information acquisition unit 108. The existing biometric information acquisition unit 108 according to the present embodiment acquires fingerprints of the three fingers of an index finger, a middle finger, and a third finger. Examples of the new biometric information acquisition unit 109 include a CMOS (Complementary Metal Oxide Semiconductor) camera. The new biometric information acquisition unit 109 acquires a palm vein image using near infrared rays.

Note that, in order to extract biometric information of the same person in a stable manner, it is desirable that the existing biometric information acquisition unit 108 and new biometric information acquisition unit 109 are mutually fixedly disposed. Also, it is desirable that existing biometric information and new biometric information are acquirable at the same time. For example, it is desirable that the existing biometric information acquisition unit 108 and new biometric information acquisition unit 109 are fixedly disposed within predetermined distance L, and a fingerprint image and a palm vein image are acquirable at the same time. The distance L is, for example, several centimeters to about 10 centimeters, which will fit in the size of a normal palm.

The communication unit 106 is, for example, a connection interface for a LAN (Local Area Network) or the like. The attribute information acquisition unit 107 is an input device such as a keyboard, mouse, or the like, and is, for example, a device configured to input an ID for identifying a user, or the like.

The biometric authentication program stored in the storage device 103 is loaded to the RAM 102 in an executable manner. The CPU 101 executes the biometric authentication program loaded in the RAM 102. Thus, the processes according to the biometric authentication device 100 are executed. Registration processing, matching processing, additional registration processing, and so forth are executed by the biometric authentication program being executed.

The registration processing is processing in which existing biometric information acquired at the living body sensor 105 is registered in a database or the like in a manner correlated with each user. The matching processing is processing in which, in the case that similarity between a user's biometric information acquired by the living body sensor 105 and registered biometric information, or the like is equal to or greater than a threshold value, determination is made that this user is the same person as a registered user. The additional registration processing is processing in which new biometric information of a user whose existing biometric information has been registered is additionally registered in a manner correlated with this user.

Examples of the additional registration processing include a case of handling increase in the number of users. The number of users of a biometric authentication device tends to increase, and higher authentication accuracy than ever than before is demanded. In order to solve this, authentication accuracy may be improved by adding new biometric information to existing biometric information. Another example of the additional registration processing is a case of adding a double registration check function. In order to implement a double registration check for confirming whether or not a user of the biometric authentication device has doubly been registered, there has to be performed 1:N authentication in which the registration data of each user is matched with all other registered data. In general, in order to implement 1:N authentication, there is obtained higher authentication accuracy than that of 1:1 authentication in which authentication is performed by matching one registration data correlated with identification information, with input matching data with 1:1. In order to solve this, authentication accuracy may be improved by adding new biometric information to existing biometric information. Another example of the additional registration processing is a case of performing measures for improvement in the rate of handling users. That is to say, in this case, the handling rate is improved by adding other new biometric information with easy authentication to existing biometric information for a user whose authentication is difficult with this existing biometric information alone.

Figure 2:
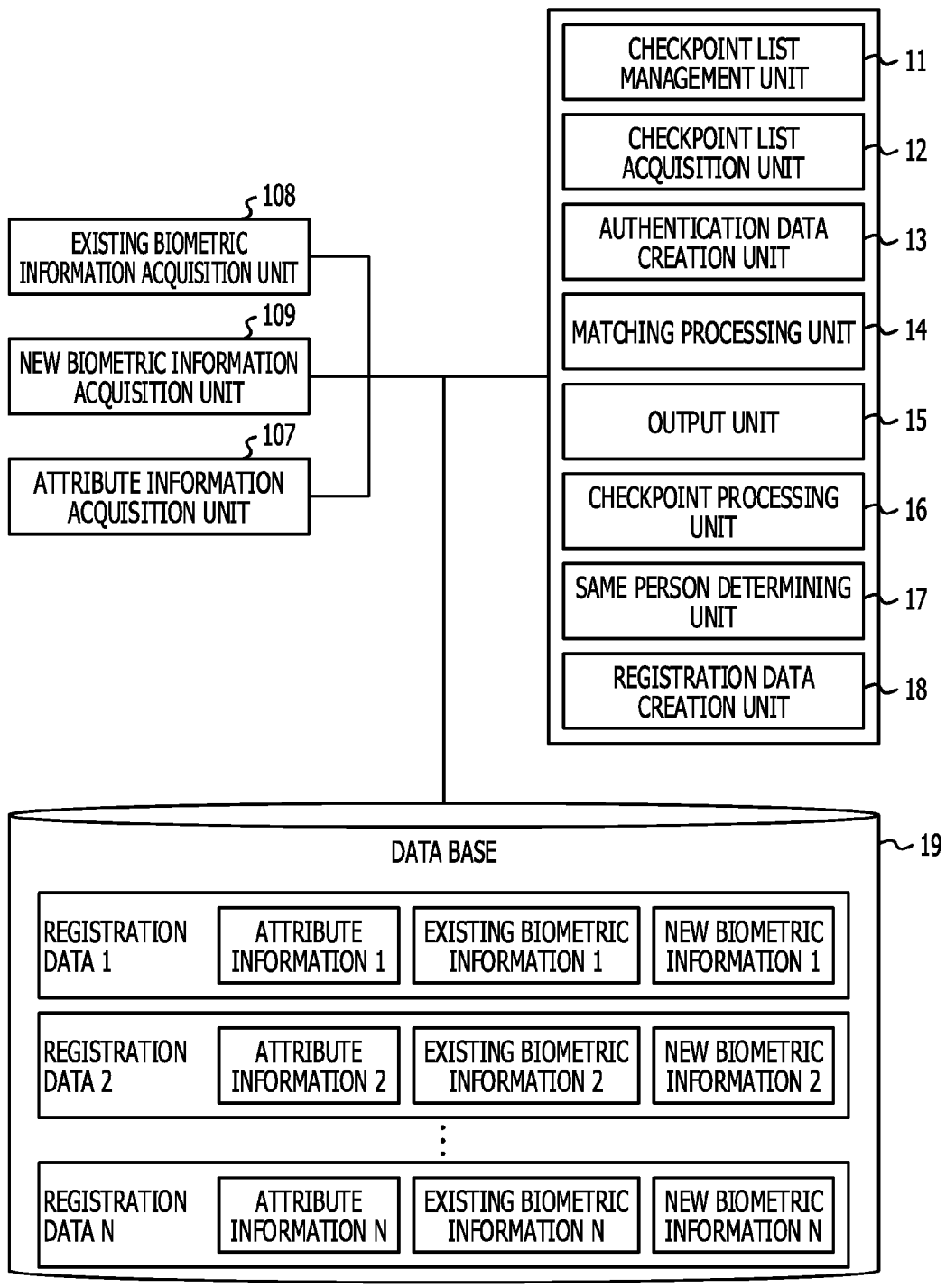
FIG. 2 is a block diagram of the functions to be realized by execution of a biometric authentication program.

FIG. 2 is a block diagram of the functions to be realized by execution of the biometric authentication program. According to execution of the biometric authentication program, there are realized a checkpoint list management unit 11, a checkpoint list acquisition unit 12, an authentication data creation unit 13, a matching processing unit 14, an output unit 15, a checkpoint processing unit 16, a same person determining unit 17, a registration data creation unit 18, a database 19, and so forth.

(Additional Registration Processing)

Figure 3:
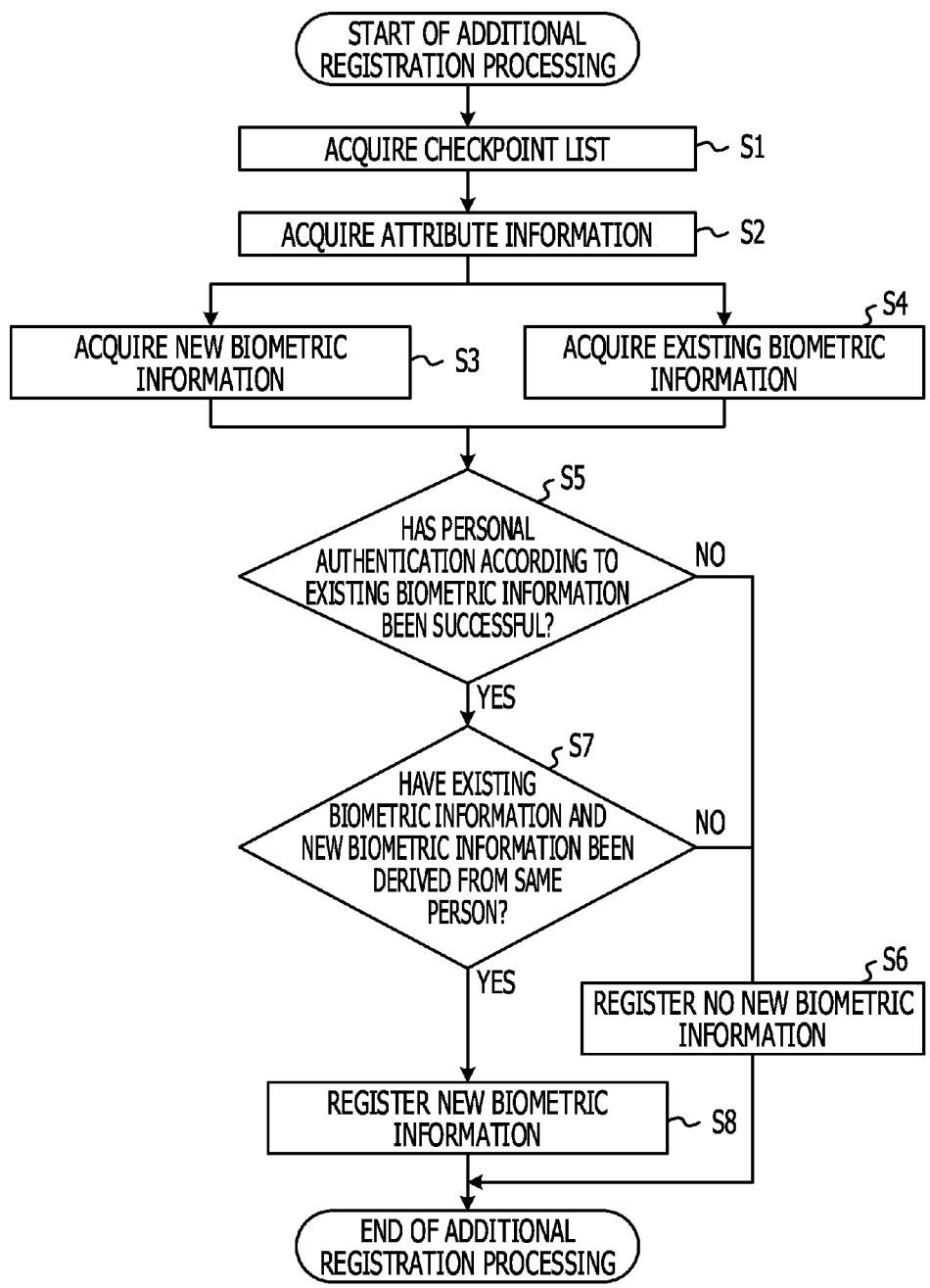
FIG. 3 is a flowchart representing an example of additional registration processing.

FIG. 3 is a flowchart representing an example of additional registration processing. First, the checkpoint list acquisition unit 12 acquires a checkpoint list in which points to be checked that are implemented for confirming that existing biometric information and new biometric information are biometric information derived from the same person (step S1).

Figure 4:
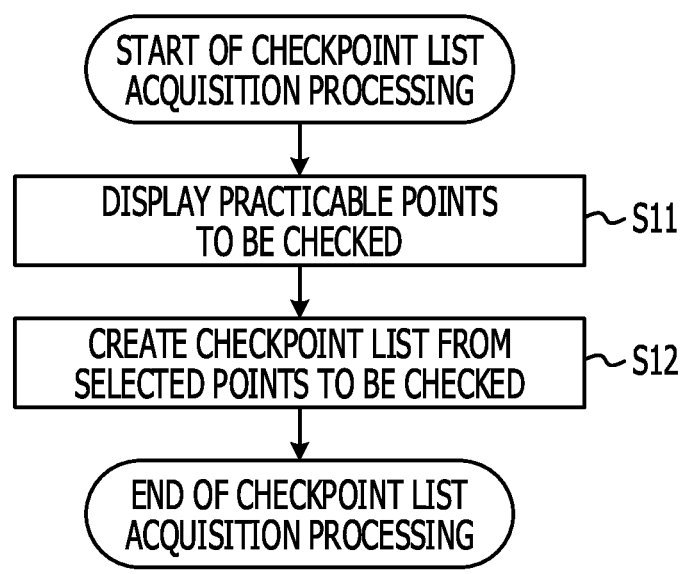
FIG. 4 is an example of a flowchart to be executed at the time of acquiring a checkpoint list.

FIG. 4 is an example of a flowchart to be executed at the time of acquiring a checkpoint list. The checkpoint list management unit 11 displays practicable points to be checked on the display device 104 with reference to FIG. 4 (step S11). The points to be checked are stored in the database 19 or the like. The checkpoint list acquisition unit 12 acquires points to be checked decided according to a security level to create a checkpoint list (step S12). According to execution of the above-described steps, the points to be checked are acquired.

FIG. 5 is a diagram representing an example of points to be checked stored in the database 19 or the like. As illustrated in FIG. 5, the points to be checked are correlated with a method for determining that existing biometric information and new biometric information are biometric information of the same person. Also, the points to be checked are correlated with a confirmation level of the biometric authentication device 100. The confirmation level is a security height level.

The checkpoint list to be acquired may include a sequence to implement points to be checked. Also, the checkpoint list acquisition unit 12 may enable a combination alone satisfying the confirmation level of the biometric authentication device 100 to be acquired when the administrator selects points to be checked. For example, the administrator of the biometric authentication device 100 or a developer of the biometric authentication device 100 previously determines a confirmation level for each point to be checked. In the case that summation of the confirmation levels of the points to be checked selected by the administrator is equal to or greater than the confirmation levels of the biometric authentication device 100, the checkpoint list acquisition unit 12 determines that this combination is a combination satisfying the confirmation level, and enables the checkpoint list to be acquired.

As illustrated in FIG. 3, next, the attribute information acquisition unit 107 acquires attribute information of the user (step S2). Examples of the attribute information include the user name of a user, and an identification symbol specific to a user. Next, the existing biometric information acquisition unit 108 acquires existing biometric information, and the new biometric information acquisition unit 109 acquires new biometric information at the same time (steps S3 and S4). Thereafter, the authentication data creation unit 13 creates authentication data from the acquired existing biometric information. Examples of the authentication data include, in the case that existing biometric information is a fingerprint, the ridge pattern of a fingerprint, and the position information of a minutia.

Thereafter, the matching processing unit 14 performs matching processing between the authentication data and the registration data registered in the database 90 to determine whether or not the matching has been successful (step S5). At this time, in the case that attribute information has also been acquired, there may be executed 1:1 matching in which the authentication data is matched with registration data alone correlated with the attribute information. Examples of the matching processing by the matching processing unit 14 include fingerprint pattern matching processing, and minutia matching processing. In the case that determination is made as result of the matching processing that the authentication data agrees with one registration data, the matching processing unit 14 outputs an authentication successful result that the user of the authentication data is an already registered regular user. Also, in the case that determination is made that there is no registration data agreeing with the authentication data, the matching processing unit 14 outputs an authentication failure that the user of the authentication data is not an already registered regular user.

In the case that the result by the matching processing unit 14 is an authentication failure, the output unit 15 displays a message to the effect that authentication has failed, on the display device 104. Thereafter, the additional registration processing is ended without additionally registering new biometric information (step S6). In the case that the result by the matching processing unit 14 is an authentication success, the output unit 15 displays a message to the effect that authentication has succeeded, on the display device 104. Also, a system configured to enable a certain application to be executed according to an authentication success may execute the application in the case of an authentication success. Further, a system configured to issue a permit for login or entering/leaving management according to an authentication success may issue a permit in the case of an authentication success. Next, the checkpoint processing unit 16 starts personal authentication processing with points to be checked included in the checkpoint list acquired by the checkpoint list acquisition unit 12.

Hereinafter, description will be made regarding an example of the points to be checked of the present embodiment, and a method for the same person determining unit 17 determining that existing biometric information and new biometric information are derived from the same person, using the points to be checked thereof. Description will be made in the present embodiment regarding a method for determining whether or not existing biometric information and new biometric information are derived from the same person using a positional relation between an imaged region of fingerprints acquired by the existing biometric information acquisition unit 108, and an imaged region of a palm acquired by the new biometric information acquisition unit 109. Note that, in the case that each of the existing biometric information acquisition unit 108 and new biometric information acquisition unit 109 consecutively enables a fingerprint image and a palm vein image to be shot multiple numbers of times, multiple checkpoint results may be obtained with a series of operations by instructing a user to assume multiple postures during shooting thereof.

A fluctuation research with various input postures will be described as a first example of points to be checked. When a user inputs new biometric information and existing biometric information to the living body sensor 105, the checkpoint processing unit 16 displays an instruction message on the display device 104 so as to input new biometric information and existing biometric information with various postures of the hand. The user inputs new biometric information and existing biometric information in accordance with the instruction thereof. Examples of various postures of the hand include a posture with a palm being raised, and a posture with a certain finger being separated from the existing biometric information acquisition unit 108.

Figure 6A:
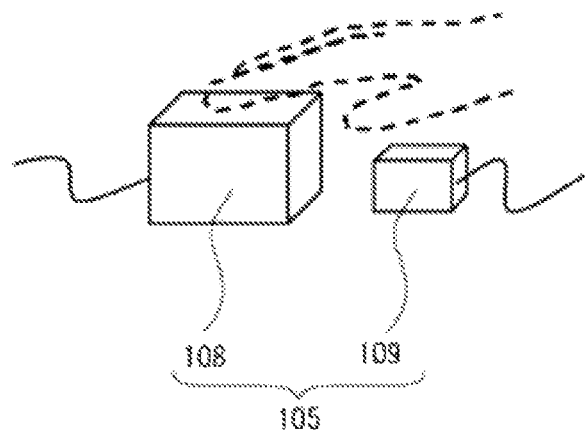
FIG. 6A is a schematic diagram in the case that a palm is held up to the living body sensor in parallel with the living body sensor.
Figure 6B:
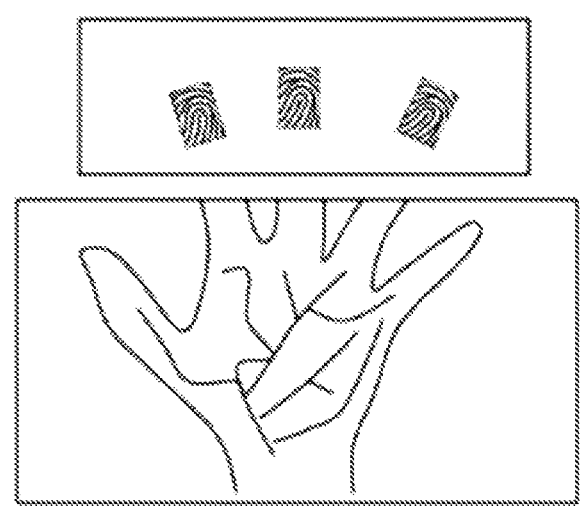
FIG. 6B is a diagram representing a fingerprint image and a palm vein image acquired by the living body sensor.
Figure 7A:
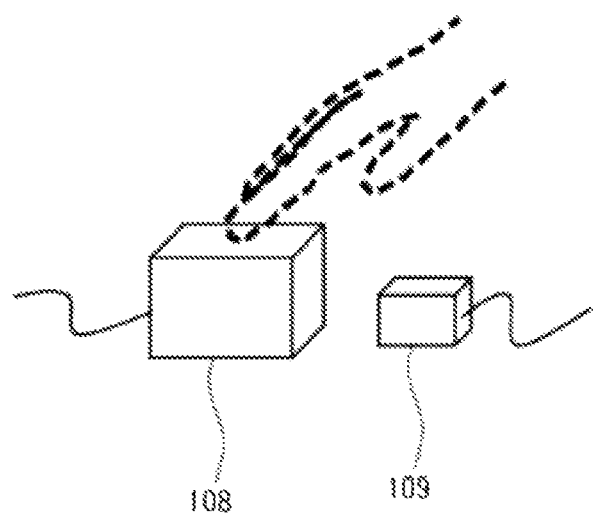
FIG. 7A is a schematic diagram in the case that the palm is separated from the living body sensor.
Figure 7B:
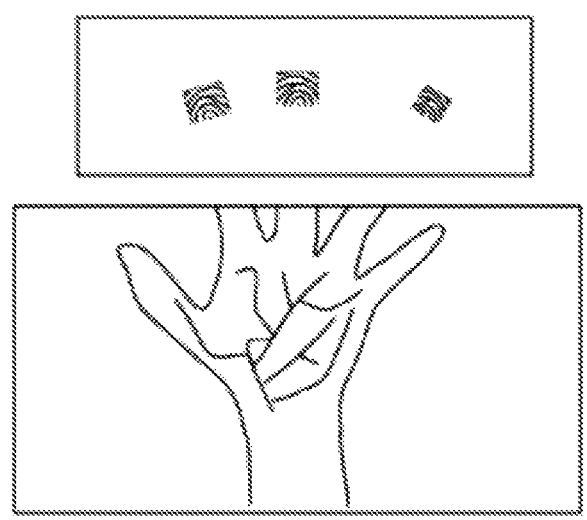
FIG. 7B is a diagram representing a fingerprint image and a palm vein image acquired by the living body sensor.
Figure 8A:
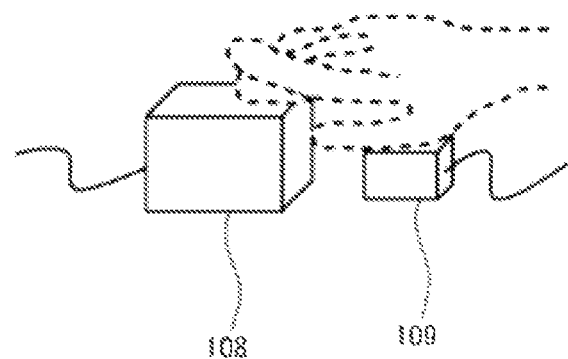
FIG. 8A is a schematic diagram in the case that the index finger is separated from the living body sensor.
Figure 8B:
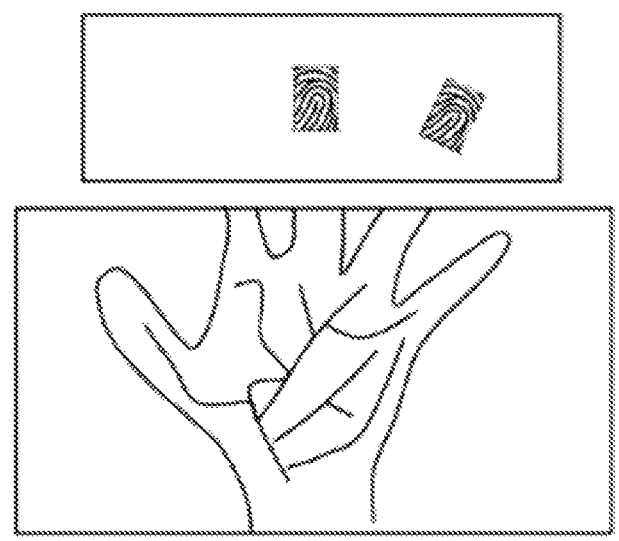
FIG. 8B is a diagram representing a fingerprint image and a palm vein image acquired by the living body sensor.

FIG. 6A is a schematic diagram in the case that a palm is held up to the living body sensor 105 in parallel with the living body sensor 105. FIG. 6B is a diagram representing a fingerprint image and a palm vein image acquired by the living body sensor 105. On the other hand, in the case that the user has input fingerprints and a palm vein with a posture raising a palm (separated from the new biometric information acquisition unit 109) as illustrated in FIG. 7A, a fingerprint image has a smaller area than that in a usual case as illustrated in FIG. 7B. Also, a palm vein image is reflected such that the wrist side is small as illustrated in FIG. 7B. Alternatively, in the case that the user has input fingerprints and a palm vein with a posture separating an index finger from the existing biometric information acquisition unit 108 as illustrated in FIG. 8A, a fingerprint image is reflected excluding the index finger portion as illustrated in FIG. 8B. Also, a palm vein image is reflected such that the index finger alone has narrower width. Also, in the case that the palm vein image has grayscale, the luminance value of the color of the base of the finger is lower than that of the base of another finger.

In the case of a posture raising a palm, the same person determining unit 17 calculates a palm inclination from new biometric information actually acquired, and calculates the ratio of a fingerprint area from existing biometric information. The ratio of the fingerprint area is calculated as a ratio in the case that the palm inclination is 0 degrees, that is, in the case that an ordinary input case is taken as 1. Next, the same person determining unit 17 compares the ratio of the fingerprint area as to the palm inclination with a value of an already created correlation table between a palm inclination and the area of a fingerprint image such as in FIG. 9, and in the case that difference thereof is difference equal to or lower than a predetermined threshold value, for example, about 0.1, determines that the new biometric information and existing biometric information are derived from the same person.

Also, in the case of an index finger assuming a posture separated from the existing biometric information acquisition unit 108, the same person determining unit 17 calculates a ratio by dividing the luminance value at the time of the index finger being raised by the luminance value of the base of an index finger at the time of ordinary input. For example, the luminance value of the base of a finger is obtained as a mean value of luminance values of a region of the finger base portion. Also, the same person determining unit 17 calculates the width of each finger at the time of the index finger being raised. Further, in the case that there is no index finger within the fingerprint image, and also, the ratio of the luminance value of the finger base is equal to or lower than a predetermined threshold value, for example, equal to or lower than 70%, and further, in the case that difference between the width of the index finger and the width of another finger is equal to or greater than a predetermined threshold value, for example, equal to or greater than 1 mm, the same person determining unit 17 determines that the existing biometric information and new biometric information are derived from the same person.

Figure 10A:
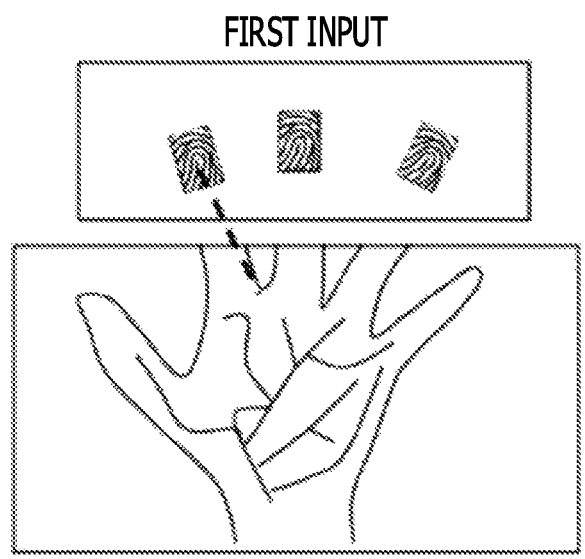
FIG. 10A and FIG. 10B are diagrams representing distance from the base of a finger to a fingerprint center position.
Figure 10B:
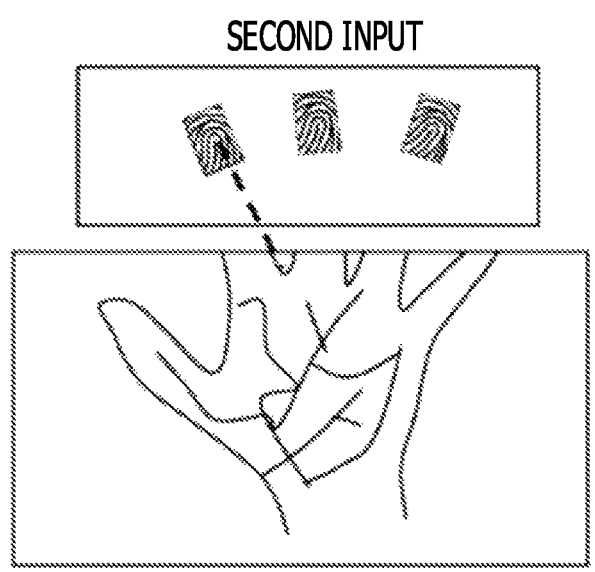

A research of distance between fingerprints and a palm vein will be described as a second example of points to be checked. The checkpoint processing unit 16 displays on the display device 104 an instruction for the user to input fingerprints and a palm vein multiple numbers of times. The checkpoint processing unit 16 calculates distance of both from a pair of a fingerprint image and a palm vein image acquired at each input. Examples of distance of both include distance from a finger base to a fingerprint center position such as FIG. 10A and FIG. 10B. The length of a finger may be calculated by a technique, for example, such as Japanese Laid-open Patent Publication No. 2012-208682 or the like. The same person determining unit 17 determines that the existing biometric information and new biometric information are the biometric information of the same person if there is no difference equal to or greater than the threshold value between distances acquired at the inputs.

A case of confirming whether or not a fingerprint image and a palm vein image have been acquired by a behavior within a movable range of a user's bone structure will be described as a third example of points to be checked. First, the checkpoint processing unit 16 shoots an image of the entirety of a user's hand using either one of the existing biometric information acquisition unit 108 and new biometric information acquisition unit 109. Next, the checkpoint processing unit 16 calculates a fingertip direction from a fingerprint image. Also, the checkpoint processing unit 16 calculates a distance from the sensor, the inclination of a palm, and a direction of a finger base from a palm vein image. Thereafter, the checkpoint processing unit 16 interpolates information between the fingerprint image and palm vein image based on each piece of information to estimate the posture of the hand at the time of input. In the case of determining that estimation of the posture of the hand is reproducible with movement within a movable range of the hand estimated from the entire image of the user's hand, the checkpoint processing unit 16 determines that the images have been input from the same hand. Examples of determination that the estimation is reproducible include that difference between the lengths of the fingers and difference between the widths of the fingers obtained from the image of the entire hand and the estimation of the posture of the hand are within a predetermined threshold value, and that the fingers of the image of the entire hand completely agree with the estimated directions of the fingers of the posture of the hand by rotating the fingers of the image of the entire hand with the finger bases as the center.

Note that, in the case that the checkpoint list includes multiple points to be checked, the same person determining unit 17 performs final determination from the results of the points to be checked (step S7). In the case that derivation from the same person has been determined in all of the points to be checked, the same person determining unit 17 finally determines that the existing biometric information and new biometric information are derived from the same person. Also, in the case that derivation of the same person has not been determined in any one of the points to be checked, even in the case that derivation from the same person has been determined in other points to be checked, the same person determining unit 17 may finally determine that the existing biometric information and new biometric information are not derived from the same person. In this case, the additional registration processing is ended without additionally registering the new biometric information (step S6).

In the case that the same person determining unit 17 has determined that the existing biometric information and new biometric information are derived from the same person, with reference to FIG. 3 again, the registration data creation unit 18 recreates registration data using the new biometric information (step S7). For example, the registration data creation unit 18 creates new registration data by adding vein patterns extracted from new biometric information to already registered existing biometric information. The recreated registration data is saved in the database 19 (step S8).

According to the above processes, registration data with the new biometric information has additionally been registered. Note that, in the case that registration data with the new biometric information has additionally been registered regarding a certain user, it is desirable in the subsequent authentication processing of the user for the matching processing unit 14 to perform matching even with the new biometric information. Also, at the time of adding a palm vein as new biometric information, the number of fingers of the fingerprints of existing biometric information may be changed. In this case, it is desirable for the registration data creation unit 18 to inhibit the same finger from being doubly registered by correlating the type of a finger to be newly registered with the type of a finger already registered in the registration data. Addition of the new biometric information may cause change in the existing biometric information acquired by the existing biometric information acquisition unit 108. At this time, registration data may be recreated using the existing biometric information acquired together with the new biometric information.

According to the present embodiment, a biometric authentication device in which registration opportunities for new biometric information are restricted may improve authentication accuracy that the existing biometric information and new biometric information are derived from the same person with accuracy corresponding to the security level of this biometric authentication device.

Second Embodiment

Figure 11:
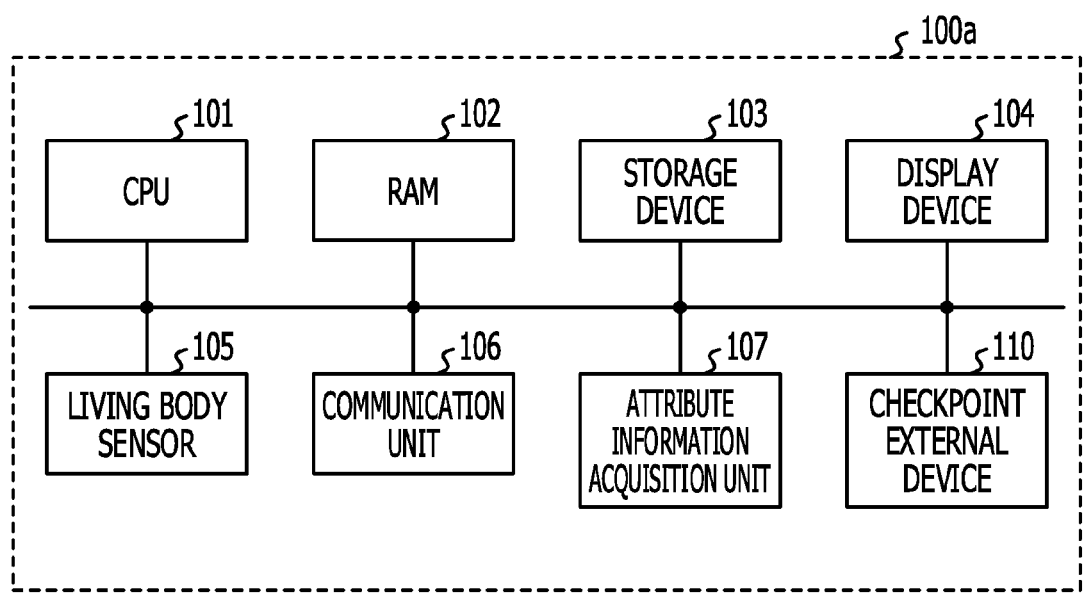
FIG. 11 is a block diagram for describing a hardware configuration of a biometric authentication device according to a second embodiment.

FIG. 11 is a block diagram for describing a hardware configuration of a biometric authentication device 100a according to a second embodiment. A point that the biometric authentication device 100a differs from the biometric authentication device 100 in FIG. 1 is in that a checkpoint external device 110 is further provided. The checkpoint external device 110 is a device configured to perform personal authentication processing with points to be checked, for example, a camera.

Figure 12:
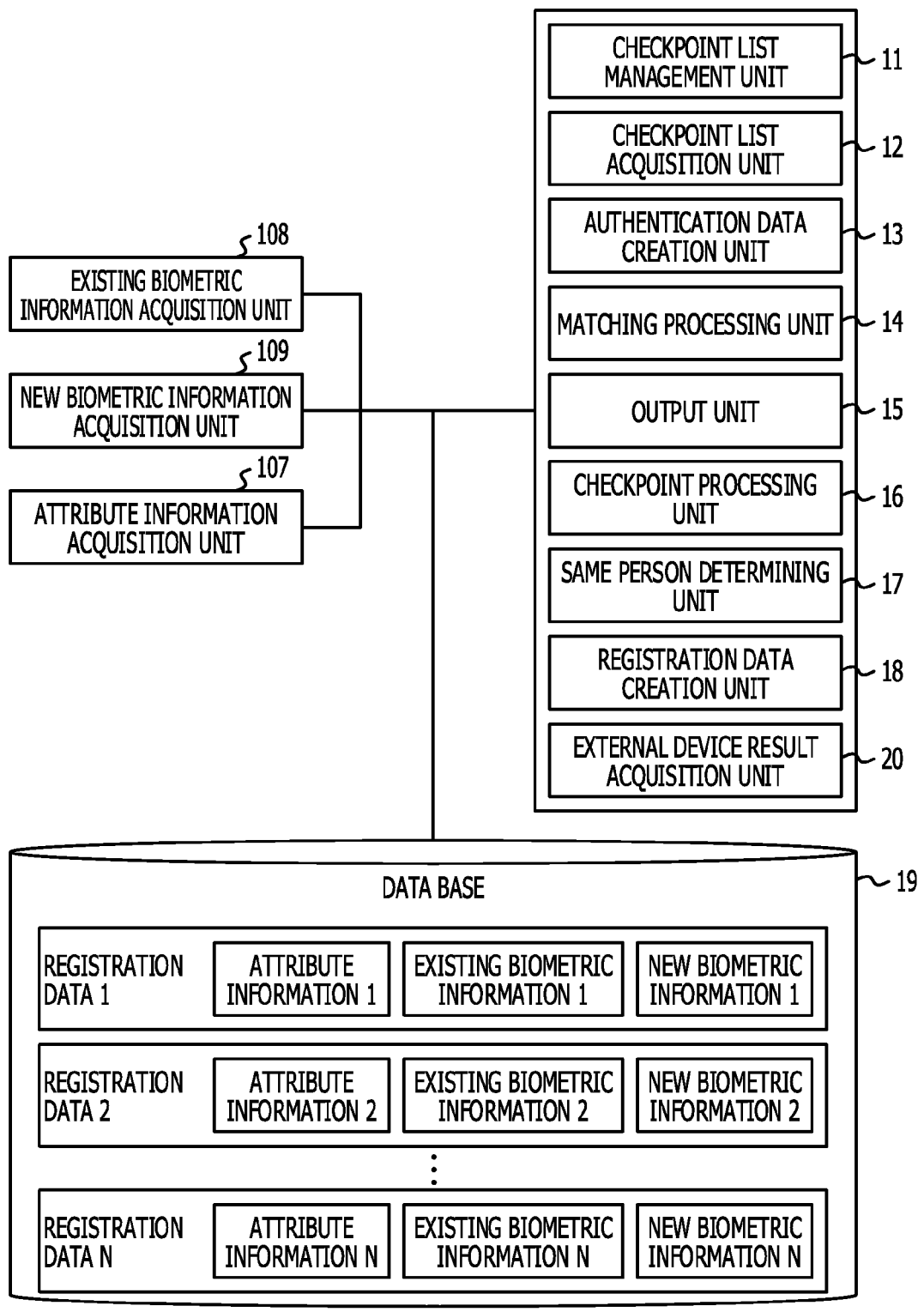
FIG. 12 is a block diagram of the functions to be realized by execution of a biometric authentication program according to the second embodiment.
Figure 13:
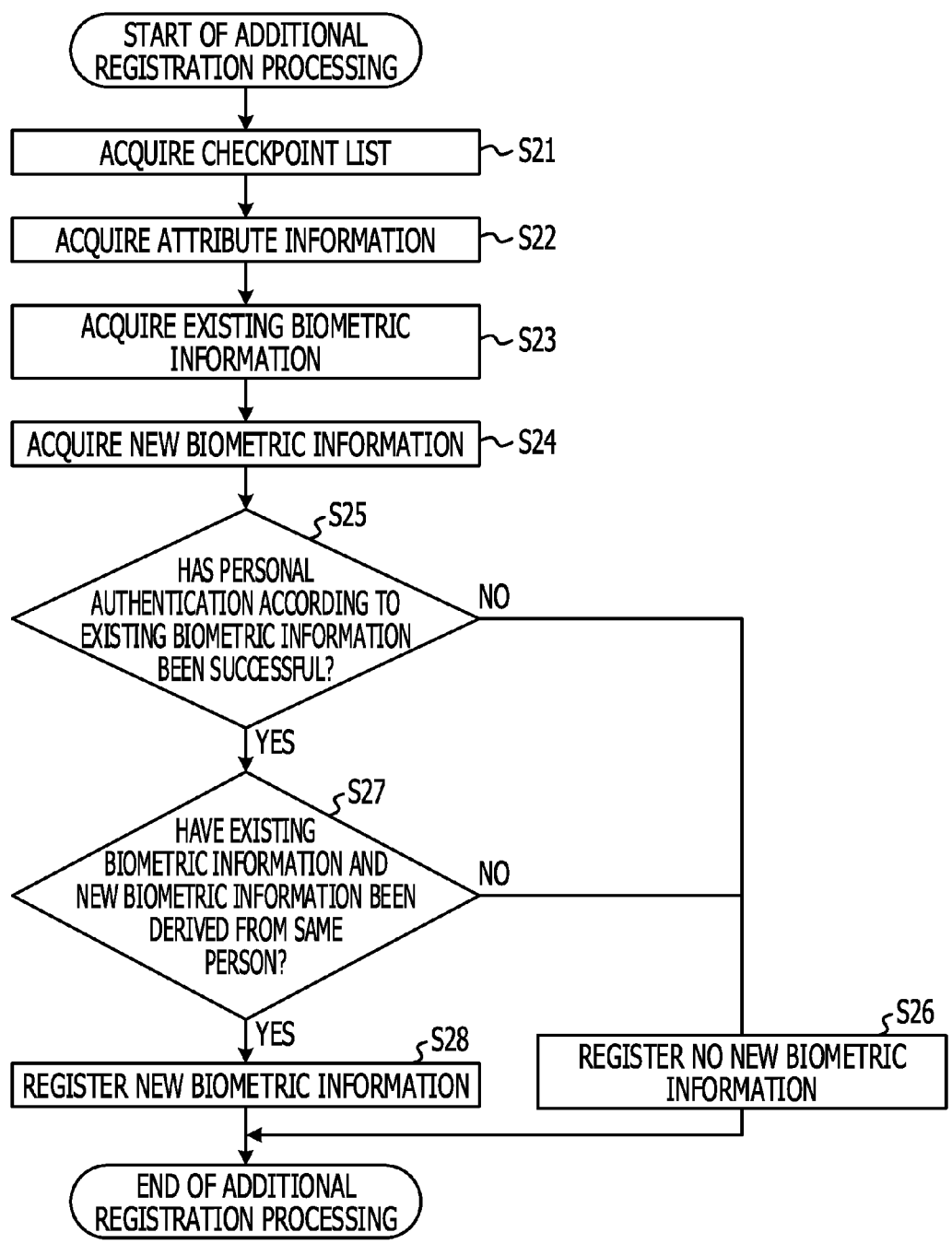
FIG. 13 is a flowchart representing an example of additional registration processing according to the second embodiment.

FIG. 12 is a block diagram of the functions to be realized by execution of a biometric authentication program according to the second embodiment. A point different from FIG. 2 is in that an external device result acquisition unit 20 is further provided. FIG. 13 is a flowchart representing an example of additional registration processing according to the present embodiment. A point in FIG. 13 different from the flowchart in FIG. 3 is in that new biometric information is acquired (step S24) after existing biometric information is acquired (step S23). Other processes (steps S21, S22, S25, S26, S27 and S28) are the same as with the flowchart in FIG. 3.

The external device result acquisition unit 20 images an acquisition scene at each of the acquisition timing of the existing biometric information acquisition unit 108 and the acquisition timing of the new biometric information acquisition unit 109. The same person determining unit 17 compares the imaged acquisition scenes to determine whether or not the input user is the same person. Determination of the same person may be made using face authentication with a user's face reflected in an image shot by the camera, or a method for acquiring the entire body of a user using a moving image to determine that new biometric information and existing biometric information are input in chronological order by a series of motions of the user.

The present embodiment also enables a biometric authentication device in which registration opportunities for new biometric information are restricted to improve authentication accuracy that the existing biometric information and new biometric information are derived from the same person with accuracy corresponding to the security level of this biometric authentication device.

First Modification

The biometric authentication device 100a newly employs a new biometric information acquisition unit 109 as the checkpoint external device 110. The checkpoint external device 110 is installed in the vicinity of a device including the existing biometric information acquisition unit 108. New biometric information and existing biometric information may be acquired at the same time. As described above, upon acquiring new biometric information and existing biometric information at the same time, it is estimated that the authentication accuracy of one piece of the biometric information deteriorates in the case that input with an ideal posture is difficult, and in the case that there is influence of a light source of another device. However, in the case of authentication accuracy that it may be confirmed that the new biometric information and existing biometric information are derived from the same person, the same acquisition may be realized.

Figure 14:
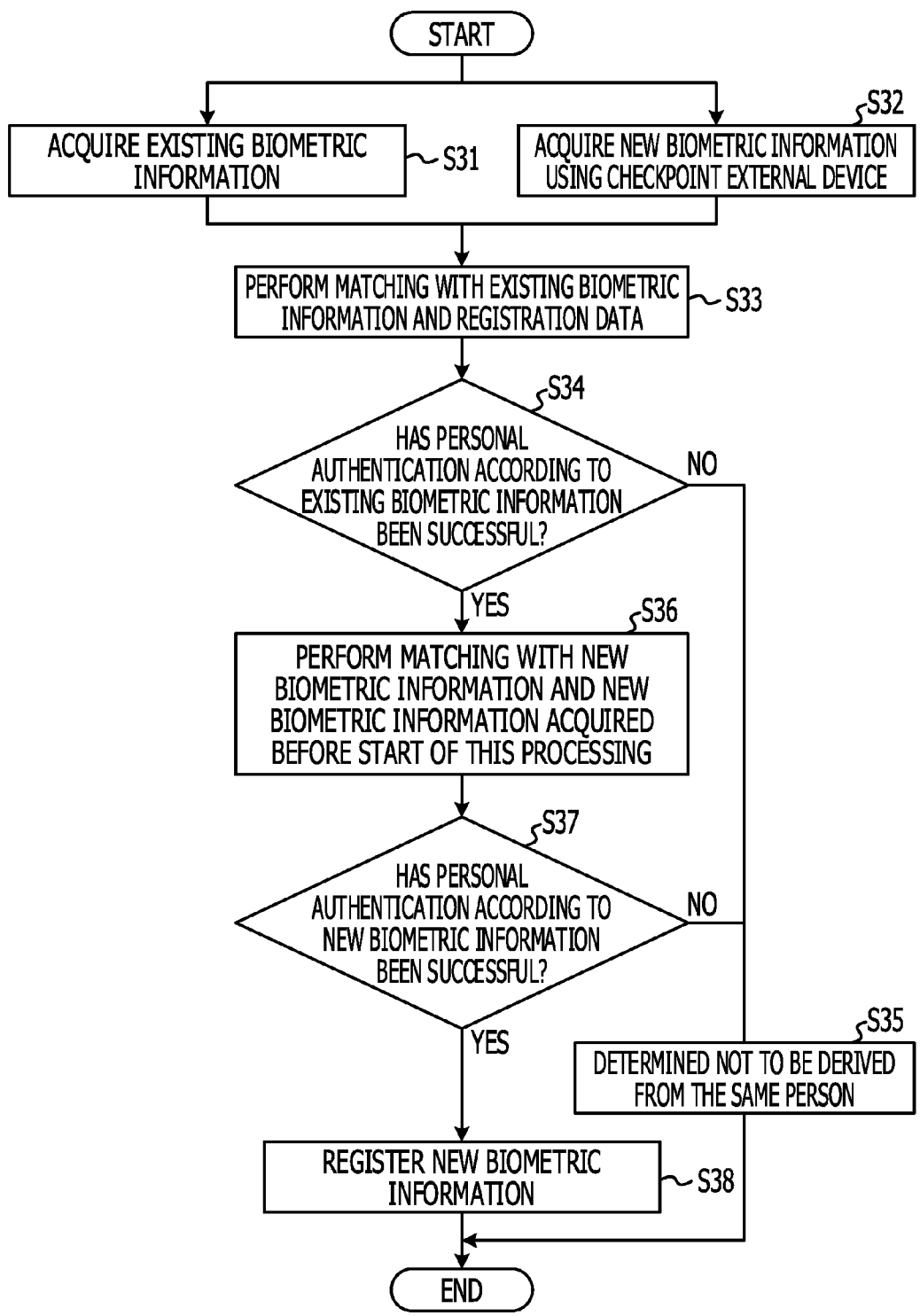
FIG. 14 is a diagram representing an example of a flowchart according to a first modification.

FIG. 14 is a diagram representing an example of a flowchart to be executed at the time of discriminating whether or not the input user is the same person based on the points to be checked in a configuration according to the first modification.

The existing biometric information acquisition unit 108 further acquires existing biometric information (step S31), and the new biometric information acquisition unit 109 used for the checkpoint external device 110 acquires new biometric information (step S32). Next, the matching processing unit 14 performs matching between the existing biometric information and the registration data (step S33).

The matching processing unit 14 determines whether or not matching with the existing biometric information acquired in step S31 has been successful (step S34). In the case that "No" has been determined in step S34, the same person determining unit 17 determines that the input user is not the same person (step S35). In the case that "Yes" has been determined in step S34, the matching processing unit 14 performs matching between the new biometric information acquired in step S32 and the new biometric information acquired (step S24 in FIG. 13) before starting the processing illustrated in FIG. 14 (step S36). The matching processing unit 14 determines whether or not the matching in step S36 has been successful (step S37). In the case that "No" has been determined in step S37, the same person determining unit 17 determines that the input user is not the same person (step S35). In the case that "Yes" has been determined in step S37, the same person determining unit 17 determines that the input user is the same person (step S38). Thereafter, the personal authentication processing with the points to be checked is ended.

According to the present modification, the existing biometric information acquisition unit 108 and new biometric information acquisition unit 109 acquire existing biometric information and new biometric information at the same time respectively, whereby determination may be made regarding whether or not the existing biometric information and new biometric information are derived from the same person.

Second Modification

The biometric authentication device 100a newly uses the new biometric information acquisition unit 109 as the checkpoint external device 110. The new biometric information acquisition unit 109 may acquire new biometric information and existing biometric information to use such information for confirming that such information are derived from the same person. Alternatively, the biometric authentication device 100a newly uses the existing biometric information acquisition unit 108 as the checkpoint external device 110. The existing biometric information acquisition unit 108 may acquire new biometric information and existing biometric information to use such information for confirming that such information are derived from the same person.

Figure 15:
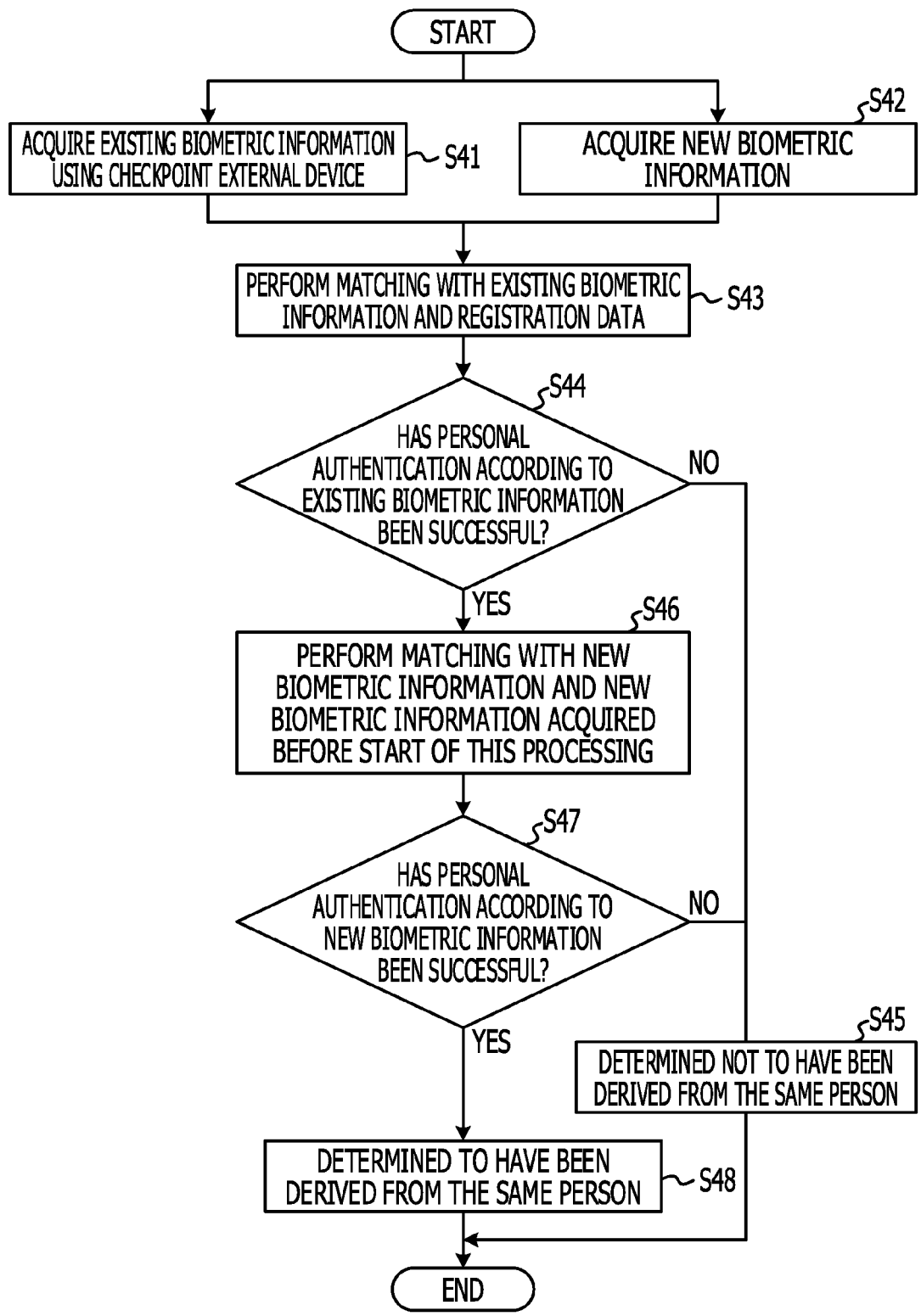
FIG. 15 is a diagram representing an example of a flowchart according to a second modification.

FIG. 15 is a diagram representing an example of a flowchart to be executed at the time of performing personal authentication processing with the points to be checked in a configuration according to the second modification. The processing with the points to be checked will be described with reference to FIG. 15. The checkpoint external device 110 acquires existing biometric information (step S41), and also acquires new biometric information (step S42). For example, in the case that the face is taken as new biometric information, and a fingerprint is taken as existing biometric information, the user brings the finger right next to the face. Next, a camera which shoots the face image serving as the new biometric information shoots a fingerprint at the same time as the face.

At this time, in order to indicate that the face and fingerprint are input from the same person, the camera shoots the user while adjusting a zoom function. The camera gradually zooms in on the vicinity of the face and fingerprint from a state in which the upper half entire body of the user is reflected. The camera finally zooms in a position where the fingerprint is reflected as large as possible, and also the facial contour is viewed. Alternatively, the user gradually approaches the camera from a position where the upper half entire body may be shot. The camera may shoot scenes during that span. The user finally approaches a position where the fingerprint is reflected as large as possible, and also the facial contour is reflected.

The camera acquires a series of images with a predetermined interval, and acquires from an image of the user's upper body to an image in which the facial contour and fingerprint are reflected. It is desirable that the predetermined interval for acquiring an image by the camera is a short period of time, for example, such as equal to or less than one second so as to inhibit the fingerprint from being replaced with another fingerprint during a series of operations.

The new biometric information acquisition unit 109 extracts a fingerprint region from an image including the widest fingerprint region out of images, and acquires this as existing biometric information. Also, the new biometric information acquisition unit 109 extracts a face region alone from an image where the entire face is reflected and also the area of the face region is the maximum, out of the images, and acquires this as new biometric information.

The same person determining unit 17 first confirms that the fingerprint and face image have been input from the same person using the images acquired at the camera. First, the same person determining unit 17 extracts the region of the user's body from an image where the upper half body is reflected. If the positions of the hand and face are included in the same body region, the same person determining unit 17 determines that the face and fingerprint have been input from the same person in the image the upper half body is reflected, and continues the processing. If there is an image where the face and fingerprint have a different body region, the same person determining unit 17 determines that the fingerprint has been input from a different person, and requests the same operation again, or ends the same person determination processing.

Next, if fluctuation is less than a predetermined value at the shortest distance between the fingerprint and the facial contour in all images shot by the camera, the same person determining unit 17 determines that the face and fingerprint have been input from the same person in all of the images, and continues the processing. In the case of an image where the above fluctuation is equal to or greater than a predetermined value, the same person determining unit 17 determines that the face and fingerprint have been input from different persons, and requests the same operation from the beginning again, or ends the personal authentication processing with the points to be checked. The above predetermined value may be set to about 10 cm, for example.

Next, the matching processing unit 14 performs matching between the existing biometric information and the registration data (step S43). The matching processing unit 14 determines whether or not the matching with the existing biometric information acquired in step S41 has been successful (step S44). In the case that "No" has been determined in step S44, the same person determining unit 17 determines that the face and fingerprint have not been input from the same person (step S45). In the case that "Yes" has been determined in step S44, the matching processing unit 14 performs matching between the new biometric information and new biometric information acquired (step S24 in FIG. 13) before starting the processing illustrated in FIG. 15 (step S46). The matching processing unit 14 determines whether or not the matching in step S46 has been successful (step S47). In the case that "No" has been determined in step S47, the same person determining unit 17 determines that the face and fingerprint have not been input from the same person (step S45). In the case that "Yes" has been determined in step S47, the same person determining unit 17 determines that the face and fingerprint have been input from the same person (step S48). Thereafter, the personal authentication processing with the points to be checked is ended.

Third Modification

The biometric authentication device 100a may employ a pulse sensor such as a pulse oximeter or the like as the checkpoint external device 110. For example, when the new biometric information acquisition unit 109 acquires new biometric information, the checkpoint external device 110 measures the pulse of an instance or circumference thereof where the new biometric information is acquired, and when existing biometric information is acquired, measures the pulse of an instance or circumference thereof where the existing biometric information is acquired, and if both pulses agree, determination may be made that the new biometric information and existing biometric information are derived from the same person.

Fourth Modification

Figure 16:
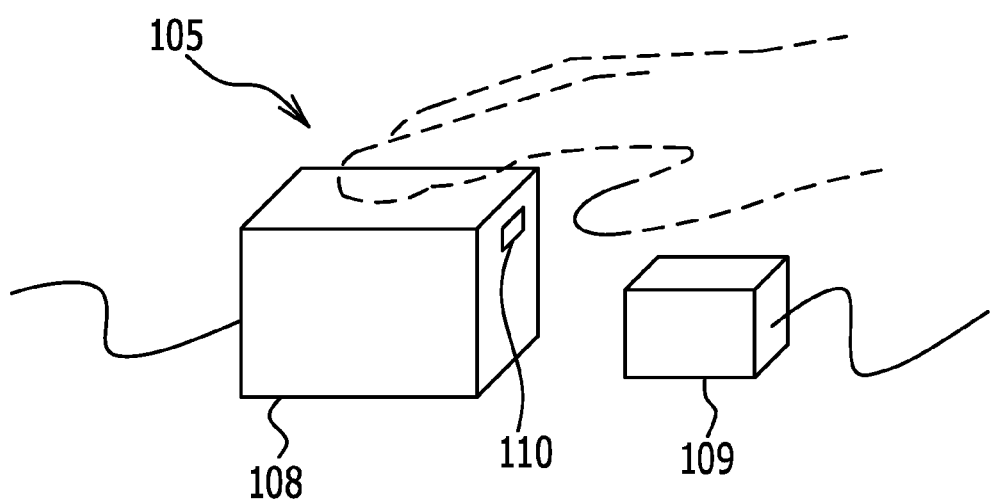
FIG. 16 is a diagram for describing an example in which a random code is used.

The biometric authentication device 100a may employ a device configured to decide, save, or display a random code as the checkpoint external device 110. The present modification will be described with reference to FIG. 16. The checkpoint external device 110 is provided to the existing biometric information acquisition unit 108, and displays a random code. The display position of the random code is positioned in an imageable range of the new biometric information acquisition unit 109. When the existing biometric information acquisition unit 108 acquires existing biometric information, the checkpoint external device 110 decides and displays one random code. The new biometric information acquisition unit 109 images the random code together with the new biometric information. In the case that the random code imaged together with new biometric information agrees with the random code displayed at the time of acquiring the existing biometric information, determination may be made that the new biometric information and existing biometric information are derived from the same person.

Third Embodiment

Figure 17:
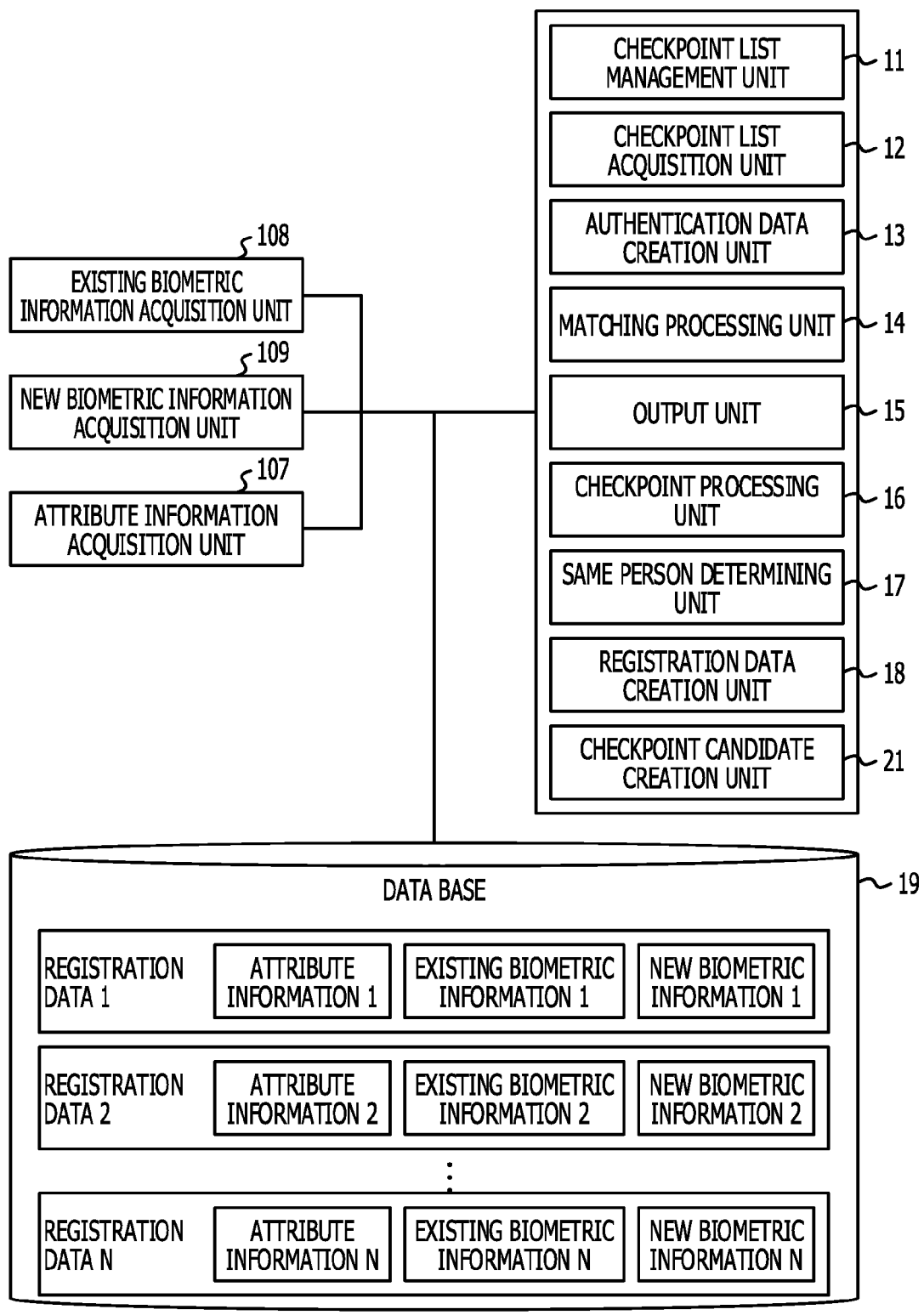
FIG. 17 is a function block diagram to be realized by execution of a biometric authentication program according to a third embodiment.
Figure 18:
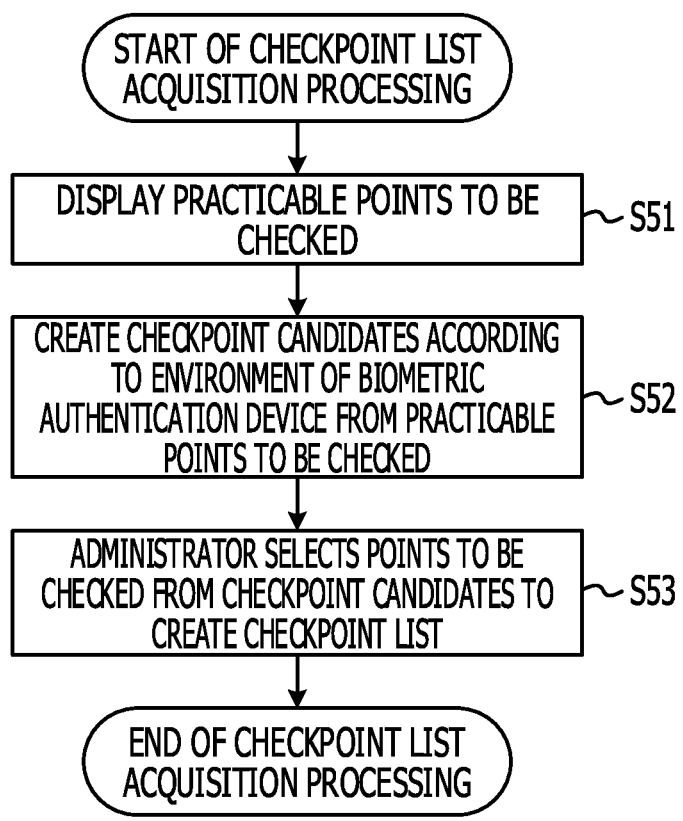
FIG. 18 is a flowchart to be executed at the time of checkpoint list acquisition processing.

FIG. 17 is a function block diagram to be realized by execution of a biometric authentication program according to a third embodiment. A biometric authentication device 100b according to the third embodiment has the same device configuration as with the first embodiment. A point that the functions in FIG. 17 differs from the functions in FIG. 2 is in that a checkpoint candidate creation unit 21 is newly provided. At the time of the additional registration processing, the same processing as with FIG. 3 is performed. However, at the time of checkpoint list acquisition processing, the flowchart in FIG. 18 is executed as an example.

The checkpoint list management unit 10 displays practicable points to be checked (step S51). Thereafter, the checkpoint candidate creation unit 21 extracts only suitable points to be checked according to an use environment of the biometric authentication device 100b, and creates checkpoint candidates of which the priorities are arrayed in a descending order. In order to create checkpoint candidates, the biometric authentication device 100b determines a confirmation level of which the higher the value is, the higher reliability of the point to be checked, implementation time, a total data size used for determination of derivation of the same person, and so forth for each point to be checked beforehand.

At the time of creating checkpoint candidates, the checkpoint candidate creation unit 21 creates checkpoint candidates as illustrated in FIG. 19 in which practicable points to be checked are arrayed in a descending order of confirmation levels in the case of an environment where importance is placed on security. Alternatively, in the case that additional registration time per one person has to be suppressed to the minimum in an environment with many users, the checkpoint candidate creation unit 21 creates checkpoint candidates with points to be checked being arrayed in an ascending order of execution time. Alternatively, in the case that the size of data to be saved has to be suppressed to the minimum in an environment with many users, the checkpoint candidate creation unit 21 creates checkpoint candidates with points to be checked being arrayed in an ascending order of total data sizes used for determination of derivation from the same person. In the case that the biometric authentication device 100b has to have a predetermined confirmation level, the checkpoint candidate creation unit 21 may create checkpoint candidates with a combination of points to be checked so as to satisfy a predetermined confirmation level. Also, the administrator may correct the checkpoint candidates by inputting points to be prioritized from the administrator terminal.

The checkpoint list acquisition unit 12 acquires points to be checked selected from the checkpoint candidates by the administrator, and creates a checkpoint list (step S53). According to execution of the above steps, the points to be checked have been acquired.

According to the present embodiment as well, a biometric authentication device in which registration opportunities for new biometric information are restricted may improve authentication accuracy that the existing biometric information and new biometric information are derived from the same person with accuracy corresponding to the security level of this biometric authentication device.

Other Examples

Figure 20:
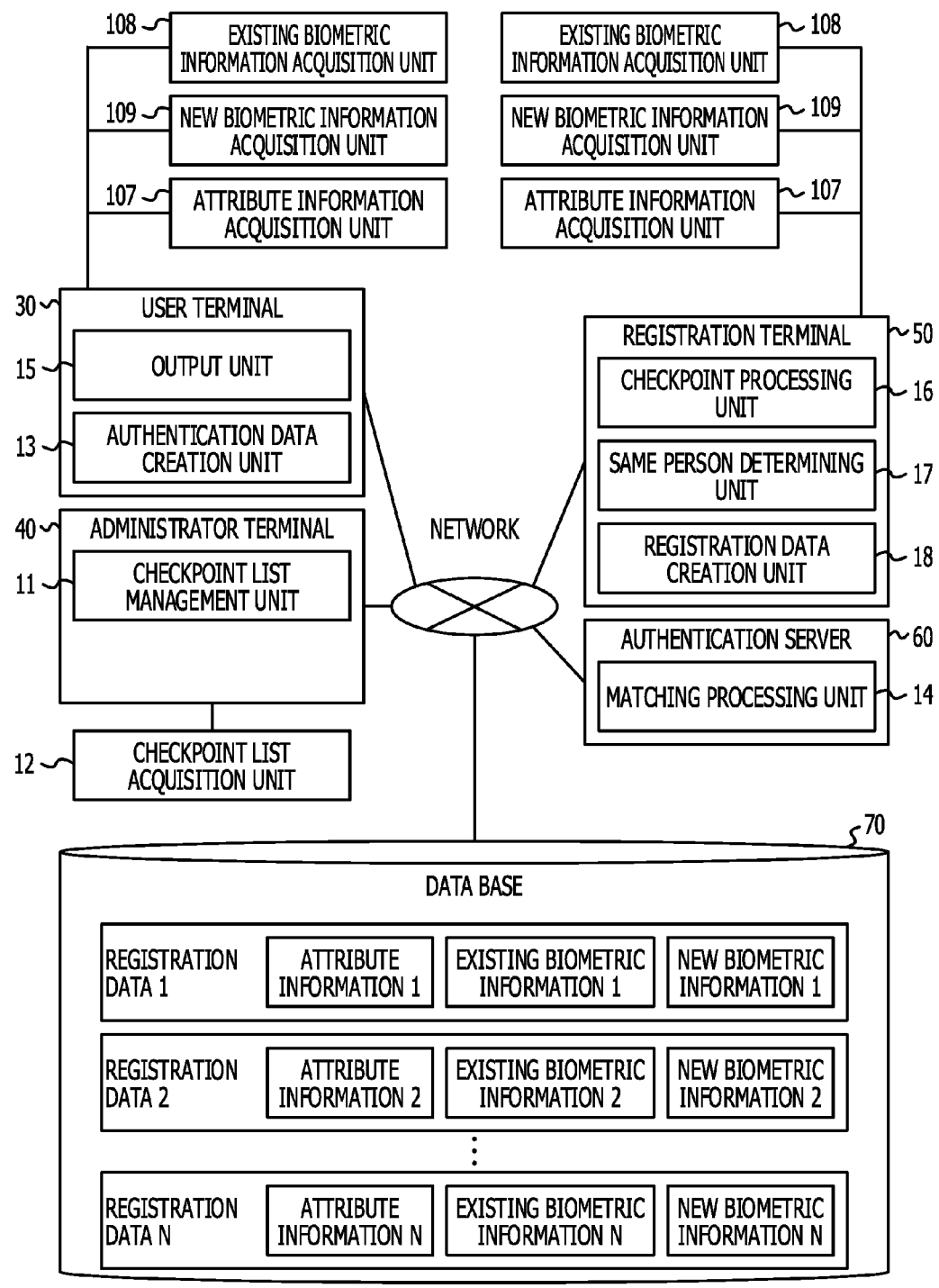
FIG. 20 is an example in which the biometric authentication device according to the first embodiment is realized by a biometric authentication system.
Figure 21A:
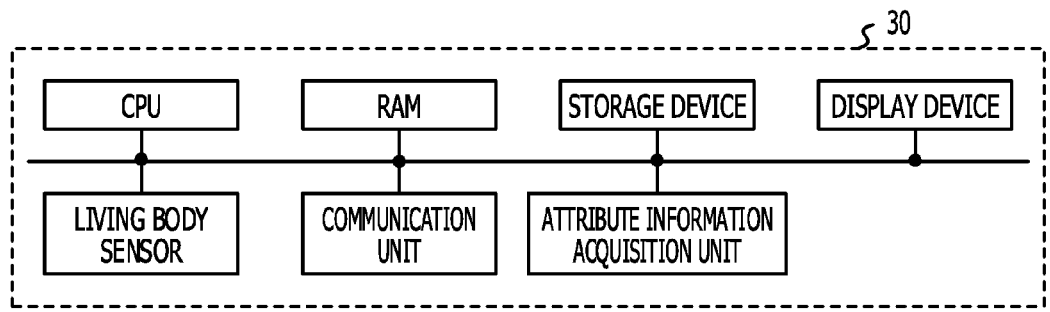
FIG. 21A, FIG. 21B, FIG. 21C, and FIG. 21D are hardware configuration diagrams of the biometric authentication system in FIG. 20.
Figure 21B:
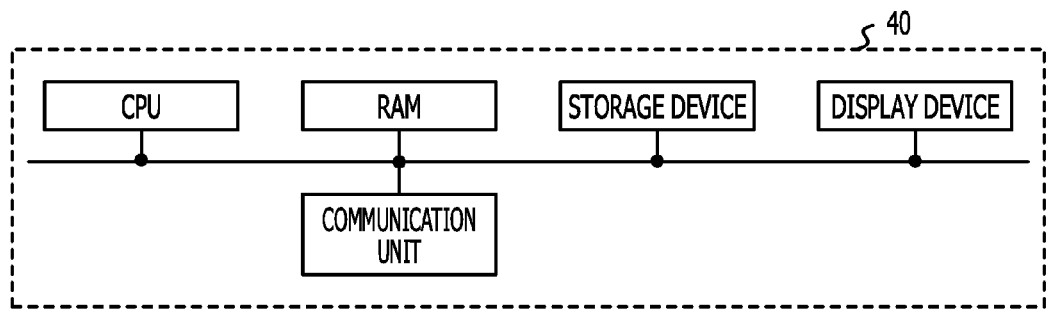
Figure 21C:
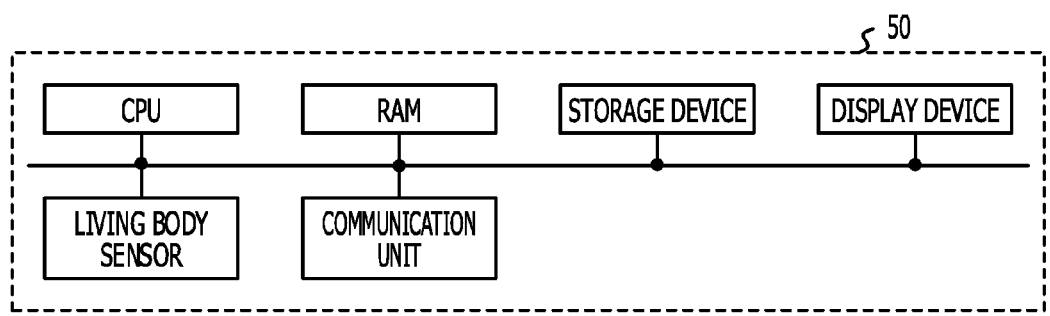
Figure 21D:
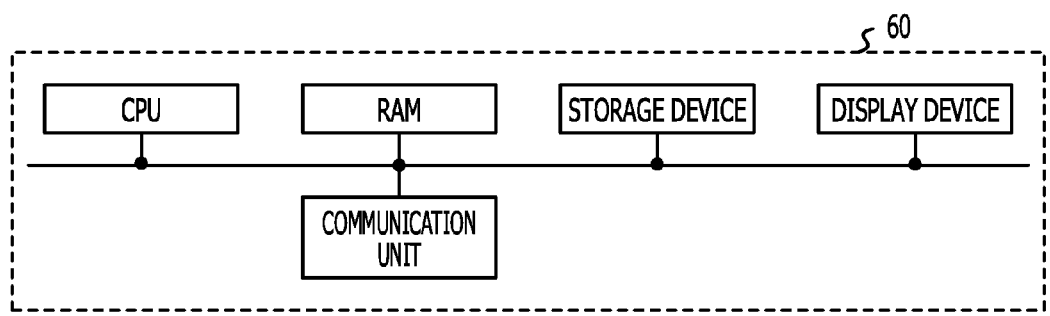

Though an example in which the functions are provided to the single biometric authentication device has been described in the above-described embodiments, the functions are not restricted to the single biometric authentication device. For example, the functions in the first embodiment may be distributed to a terminal, a server, and so forth. FIG. 20 is an example in which the biometric authentication device 100 according to the first embodiment is realized by a biometric authentication system including multiple terminals and a server. The authentication data creation unit 13 and output unit 15 may be realized within a user terminal 30 including the attribute information acquisition unit 107, existing biometric information acquisition unit 108, and new biometric information acquisition unit 109. The checkpoint list management unit 11 and checkpoint list acquisition unit 12 may be realized within an administrator terminal 40. The matching processing unit 14 may be realized within an authentication server 60 including a database 70. The checkpoint processing unit 16, same person determining unit 17, and registration data creation unit 18 may be realized within a registration terminal 50 including the attribute information acquisition unit 107, existing biometric information acquisition unit 108, and new biometric information acquisition unit 109.

FIG. 21A, FIG. 21B, FIG. 21C, and FIG. 21D are hardware configuration diagrams of the biometric authentication system in FIG. 20. The user terminal 30 in FIG. 21A includes a CPU, RAM, a storage device, a display device, a living body sensor, a communication unit, an attribute information acquisition unit, and so forth. This living body sensor includes the existing biometric information acquisition unit 108 and new biometric information acquisition unit 109. The administrator terminal 40 in FIG. 21B includes a CPU, RAM, a storage device, a display device, a communication unit, and so forth. The registration terminal 50 in FIG. 21C includes a CPU, RAM, a storage device, a display device, a living body sensor, a communication unit, and so forth. This living body sensor includes the existing biometric information acquisition unit 108 and new biometric information acquisition unit 109. The authentication server 60 in FIG. 21D includes a CPU, RAM, a storage device, a display device, a communication unit, and so forth. The biometric authentication program is stored in any one or more devices, and is executed at each device.

Figure 22:
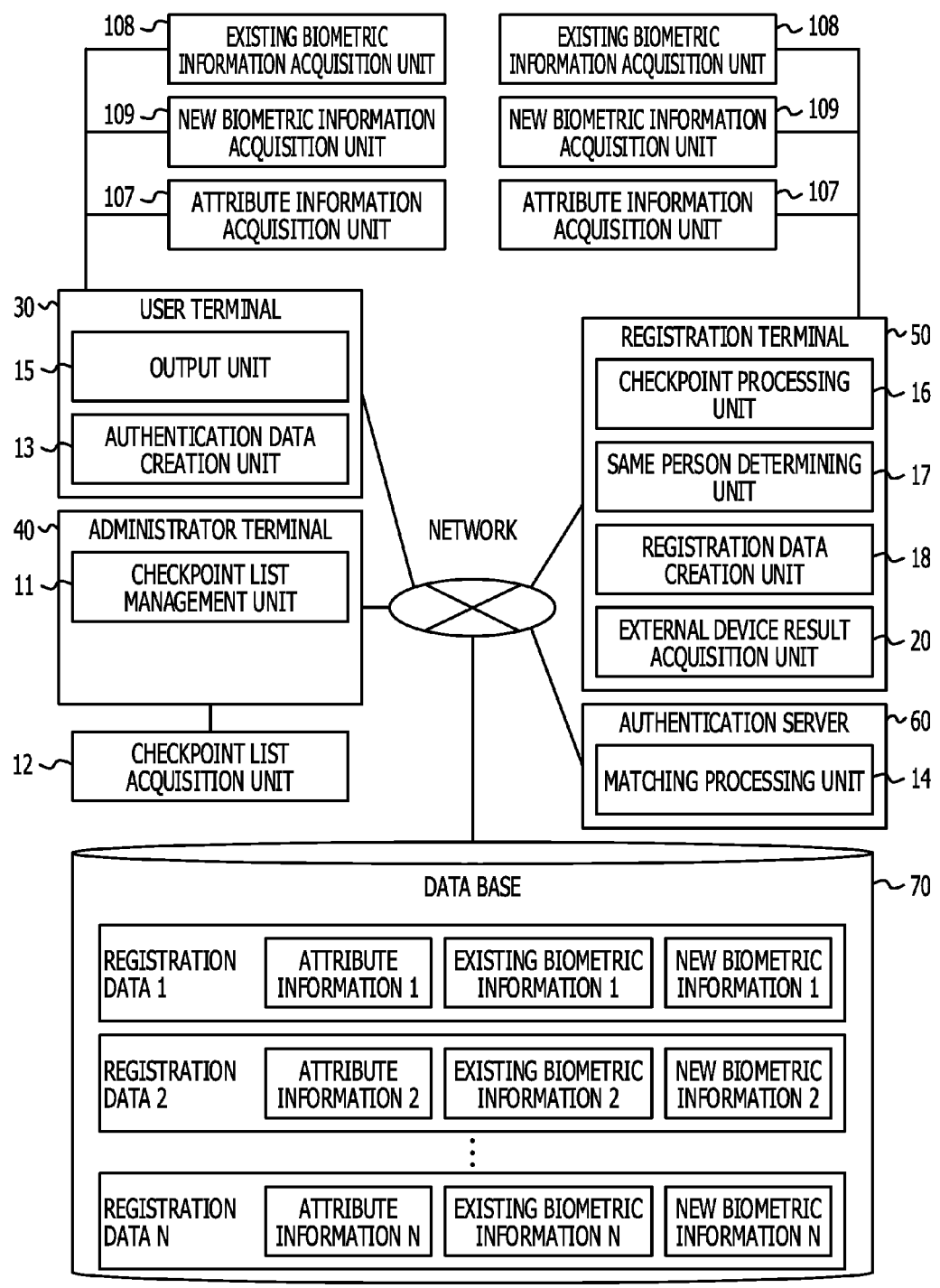
FIG. 22 is an example in which the biometric authentication device according to the second embodiment is realized by a biometric authentication system.
Figure 23A:
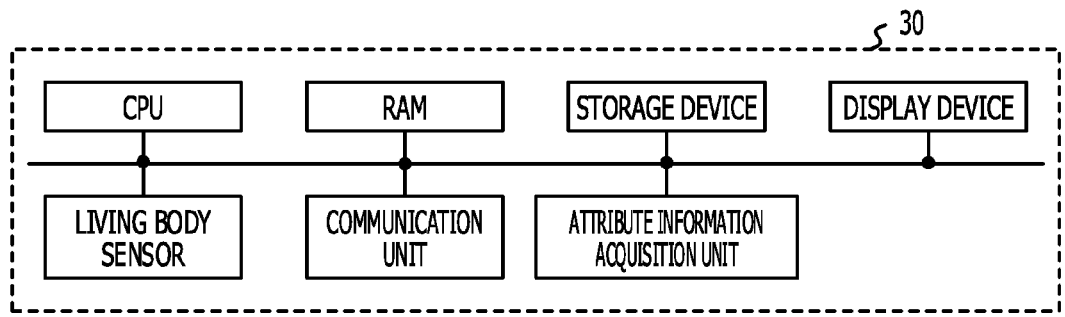
FIG. 23A, FIG. 23B, FIG. 23C, and FIG. 23D are hardware configuration diagrams of the biometric authentication system in FIG. 22.
Figure 23B:
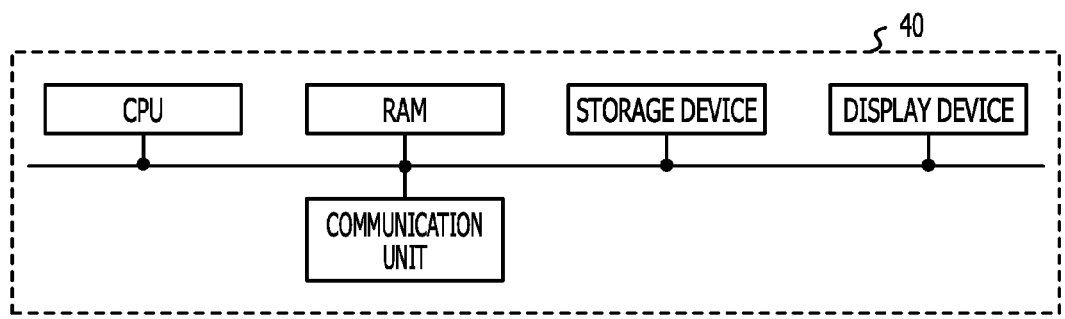
Figure 23C:
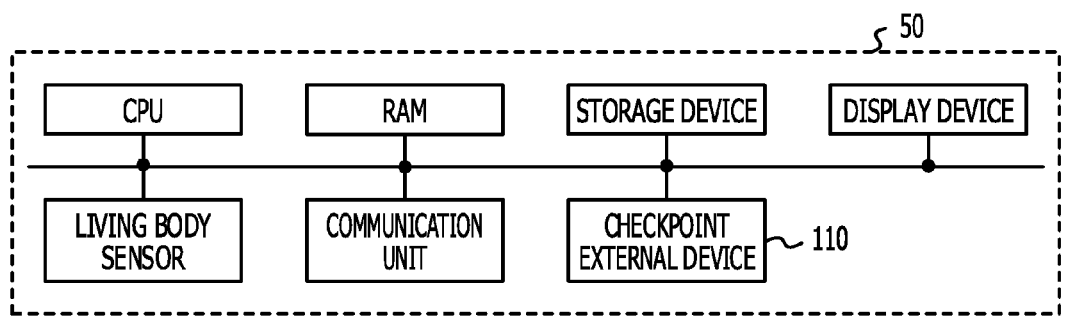
Figure 23D:
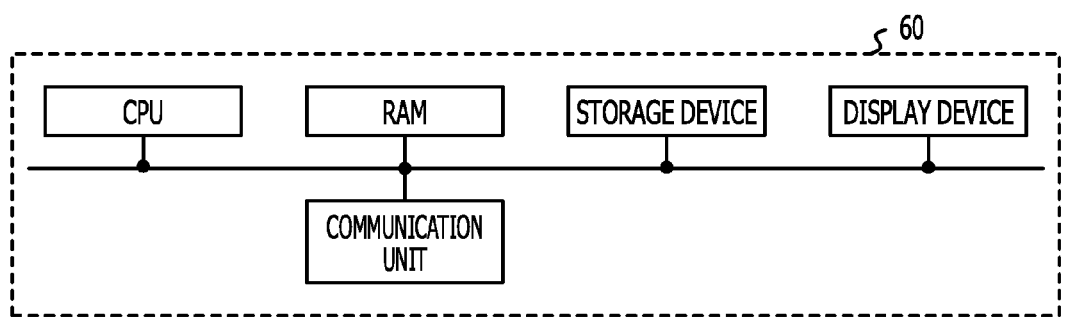

FIG. 22 is an example in which the biometric authentication device 100a according to the second embodiment is realized by a biometric authentication system including multiple terminals and a server. A point that FIG. 22 differs from FIG. 20 is in that is in that the external device result acquisition unit 20 is realized within the registration terminal 50. FIG. 23A, FIG. 23B, FIG. 23C, and FIG. 23D are hardware configuration diagrams of the biometric authentication system in FIG. 22. A point that FIG. 23 differs from FIG. 21 is in that the checkpoint external device 110 is provided in the registration terminal 50. Note that the checkpoint external device 110 may be provided independently from the registration terminal 50 via a network.

Figure 24:
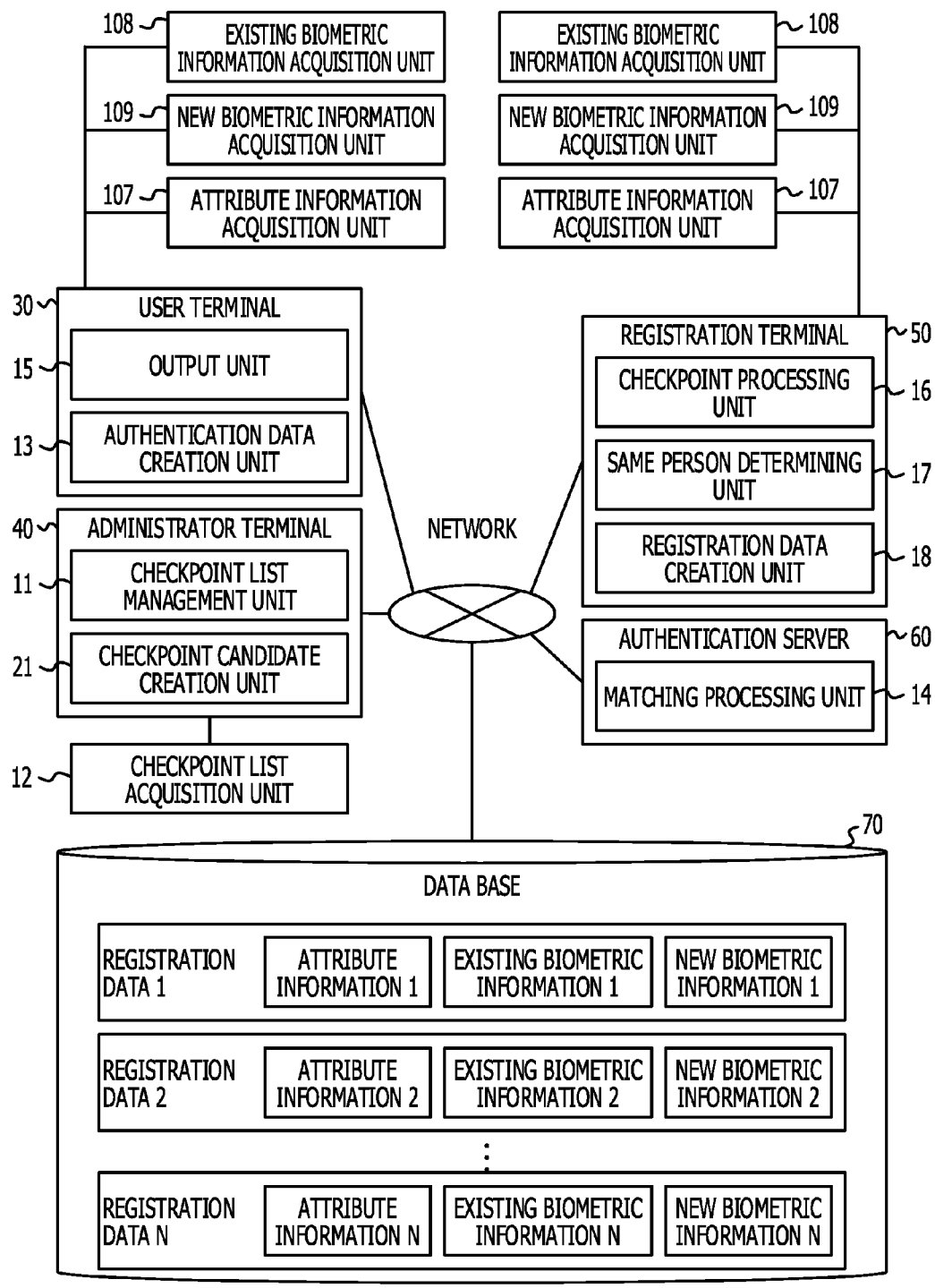
FIG. 24 is an example in which the biometric authentication device according to the third embodiment is realized by a biometric authentication system.

FIG. 24 is an example in which the biometric authentication device 100b according to the third embodiment is realized by a biometric authentication system including multiple terminals and a server. A point that FIG. 24 differs from FIG. 20 is in that the checkpoint candidate creation unit 21 is realized within the administrator terminal 40. The hardware configuration is the same as that in FIG. 21.

Note that a fingerprint image serving as existing biometric information and a palm vein image serving as new biometric information have been employed in the above-described embodiments, but mutually different types of biometric information may be employed. Also, as measures for forged fingerprints, a technique for determining whether or not a living body is a forged finger, for example, such as Japanese Laid-open Patent Publication No. 2009-238014, may be employed in the above-described embodiments.

Though the embodiments of the present disclosure have been described in detail, the present disclosure is not restricted to such particular embodiments, various modifications and changes may be made without departing from the essence of the present disclosure described in the claims.

What is claimed is:

1. A biometric authentication device comprising:
a memory; and
a processor coupled to the memory and configured to:
generate first biometric information based on a first image of a living body portion,
generate second biometric information based on a second image of another living body portion,
when authentication with the first biometric information has been successful, identify a positional relation between the living body portion and the another living body portion using a method from among a plurality of methods,
determine whether or not the positional relation satisfies a condition,
determine the second biometric information is from a user corresponding to the first biometric information when it is determined that the positional relation satisfies the condition, and
register the second biometric information associated with the user,
wherein the plurality of methods include a first method for determining an inclination of the another living body portion as to an imaging plane of a camera capturing the second image as the positional relation, and a second method for determining a distance between the living body portion and the another living body portion as the positional relation.

2. The biometric authentication device according to claim 1, wherein the method is selected from among the plurality of methods based on one of a plurality of security levels.

3. The biometric authentication device according to claim 2,
wherein the memory is configured to store correspondence information that indicates correspondence between each one of the plurality of methods and each of the plurality of security levels, and
wherein the processor is further configured to display the plurality of methods acquired from a database, and select the method based on an input.

4. The biometric authentication device according to claim 1,
wherein the living body portion is a finger or fingerprint, and
wherein the another living body portion is a palm or palm vein.

5. The biometric authentication device according to claim 4,
wherein the processor is further configured to display a message instructing a posture of the finger or the palm at the time of imaging before the first image and the second image are imaged.

6. The biometric authentication device according to claim 1,
wherein the processor is configured to acquire the first image from another camera, and the second image from the camera disposed at a certain distance from the another camera.

7. The biometric authentication device according to claim 6,
wherein the another camera and the camera are controlled so as to perform imaging at the same timing.

8. The biometric authentication device according to claim 6,
wherein the camera is controlled so as to perform imaging after imaging by the another camera.

9. The biometric authentication device according to claim 1,
wherein the processor is configured to determine whether the second biometric information is derived from the user corresponding to the first biometric information, when a first random code displayed at the time of acquiring the first biometric information agrees with a second random code acquired from the second image.

10. A biometric authentication method executed by a processor, comprising:
generating first biometric information based on a first image of a living body portion,
generating second biometric information based on a second image of another living body portion,
when authentication with the first biometric information has been successful, identifying, by the processor, a positional relation between the living body portion and the another living body portion using a method from among a plurality of methods, determining whether or not the positional relation satisfies a condition, determining the second biometric information is from a user corresponding to the first biometric information when it is determined that the positional relation satisfies the condition; and registering the second biometric information associated with the user, wherein the plurality of methods include a first method for determining an inclination of the another living body portion as to an imaging plane of a camera capturing the second image as the positional relation, and a second method for determining a distance between the living body portion and the another living body portion as the positional relation.

11. A biometric authentication device comprising:

a memory; and a processor coupled to the memory and configured to:
generate first biometric information based on a first image of a living body portion,
generate second biometric information based on a second image of another living body portion,
authenticate that the first biometric information corresponds to a user,
when the first biometric information is authenticated, identify a positional relation between the living body portion and the another living body portion using a method from among a plurality of methods,
determine whether or not the positional relation satisfies a condition,
determine the second biometric information is from the user corresponding to the first biometric information when it is determined that the positional relation satisfies the condition, and
add the second biometric information associated with the first biometric information,
wherein the plurality of methods include a first method for determining an inclination of the another living body portion as to an imaging plane of a camera capturing the second image as the positional relation, and a second method for determining a distance between the living body portion and the another living body portion as the positional relation.

12. The biometric authentication device according to claim 11 further determines the second biometric information is from the user by acquiring a checkpoint list and checking points in the checkpoint list.

* * * * *